US011204365B2

(12) United States Patent
Olivier et al.

(10) Patent No.: US 11,204,365 B2
(45) Date of Patent: Dec. 21, 2021

(54) MULTI-AXIS, SINGLE MASS ACCELEROMETER

(71) Applicant: ION Geophysical Corporation, Houston, TX (US)

(72) Inventors: André W. Olivier, River Ridge, LA (US); Lawrence Philip Behn, Houston, TX (US); Matthew Greco, Metairie, LA (US); Cornelis A. M. Faber, Voorhout (NL)

(73) Assignee: ION Geophysical Corporation, Houston, TX (US)

( * ) Notice: Subject to any disclaimer, the term of this patent is extended or adjusted under 35 U.S.C. 154(b) by 106 days.

(21) Appl. No.: 16/569,764

(22) Filed: Sep. 13, 2019

(65) Prior Publication Data

US 2020/0088757 A1    Mar. 19, 2020

Related U.S. Application Data

(60) Provisional application No. 62/730,598, filed on Sep. 13, 2018.

(51) Int. Cl.
*G01P 15/03*    (2006.01)
*G01P 1/02*    (2006.01)
(Continued)

(52) U.S. Cl.
CPC ............ *G01P 15/032* (2013.01); *G01P 1/023* (2013.01); *G01P 15/18* (2013.01); *G01V 1/30* (2013.01)

(58) Field of Classification Search
CPC ........ G01P 15/18; G01P 15/08; G01P 15/097; G01P 15/0802; G01P 1/02; G01P 1/023; G01P 15/032; G01P 15/09; G01V 1/30
See application file for complete search history.

(56) References Cited

U.S. PATENT DOCUMENTS

| 3,307,054 A | 2/1967 | Shoor |
| 3,706,217 A | 12/1972 | Slater et al. |

(Continued)

FOREIGN PATENT DOCUMENTS

| AU | 2016344004 A1 | 5/2017 |
| CA | 3003466 A1 | 5/2017 |

(Continued)

OTHER PUBLICATIONS

Second Office Action dated Feb. 6, 2020 in connection with Chinese Patent Application No. 201680077142.5, 31 pages including English translation.

(Continued)

*Primary Examiner* — Helen C Kwok
(74) *Attorney, Agent, or Firm* — Patterson + Sheridan, LLP

(57) ABSTRACT

A multi-axis, single mass acceleration sensor includes a three-dimensional frame, a test mass, a plurality of transducers, and a plurality of struts. The test mass may have three principal axes disposed within and spaced apart from the frame. The transducers are mechanically coupled to the frame. The struts are configured to couple to the central mass at each of the three principal axes, respectively, and to couple with respective sets of the transducers, thereby suspending the test mass within the frame. The sensor is thus responsive to translational motion in multiple independent directions and to rotational motion about multiple independent axes.

35 Claims, 9 Drawing Sheets

(51) Int. Cl.
*G01P 15/18* (2013.01)
*G01V 1/30* (2006.01)

(56) References Cited

U.S. PATENT DOCUMENTS

| | | | |
|---|---|---|---|
| 4,348,142 A | 9/1982 | Figour | |
| 4,398,417 A | 8/1983 | Shutt | |
| 4,500,979 A | 2/1985 | Scott | |
| 4,510,802 A | 4/1985 | Peters | |
| 4,601,206 A | 7/1986 | Watson | |
| 4,711,125 A | 12/1987 | Morrison | |
| 4,736,640 A | 4/1988 | Hooks | |
| 4,870,290 A | 9/1989 | Deck | |
| 4,893,930 A | 1/1990 | Garrett et al. | |
| 4,941,243 A | 7/1990 | Cleveland | |
| 5,007,292 A | 4/1991 | Crowe et al. | |
| 5,046,057 A | 9/1991 | Berni | |
| 5,224,380 A | 7/1993 | Paik | |
| 5,383,363 A | 1/1995 | Kulmaczewski | |
| 5,408,879 A | 4/1995 | Vreeburg et al. | |
| 5,512,794 A | 4/1996 | Kuebler et al. | |
| 5,572,081 A | 11/1996 | Starck | |
| 5,589,828 A | 12/1996 | Armstrong | |
| 5,673,330 A | 9/1997 | Chang | |
| 5,748,567 A | 5/1998 | Mori et al. | |
| 5,767,840 A | 6/1998 | Selker | |
| 5,831,164 A | 11/1998 | Reddi et al. | |
| 5,866,817 A | 2/1999 | Mori et al. | |
| 5,969,268 A | 10/1999 | Sommerfeld et al. | |
| 5,996,412 A | 12/1999 | Hansen | |
| 5,996,416 A | 12/1999 | Eguchi | |
| 5,999,084 A | 12/1999 | Armstrong | |
| 6,094,991 A | 8/2000 | Stewart et al. | |
| 6,102,802 A | 8/2000 | Armstrong | |
| 6,122,965 A | 9/2000 | Seidel et al. | |
| 6,135,886 A | 10/2000 | Armstrong | |
| 6,160,763 A | 12/2000 | Cole | |
| 6,208,271 B1 | 3/2001 | Armstrong | |
| 6,222,525 B1 | 4/2001 | Armstrong | |
| 6,285,356 B1 | 9/2001 | Armstrong | |
| 6,310,606 B1 | 10/2001 | Armstrong | |
| 6,343,991 B1 | 2/2002 | Armstrong | |
| 6,344,791 B1 | 2/2002 | Armstrong | |
| 6,347,997 B1 | 2/2002 | Armstrong | |
| 6,349,604 B1 | 2/2002 | Byun et al. | |
| 6,351,205 B1 | 2/2002 | Armstrong | |
| 6,397,677 B1* | 6/2002 | Kinsley | G01P 15/0888 310/329 |
| 6,400,303 B2 | 6/2002 | Armstrong | |
| 6,404,584 B2 | 6/2002 | Armstrong | |
| 6,415,707 B1 | 7/2002 | Armstrong | |
| 6,453,745 B1 | 9/2002 | Jalkanen | |
| 6,456,778 B2 | 9/2002 | Armstrong | |
| 6,469,691 B1 | 10/2002 | Armstrong | |
| 6,470,078 B1 | 10/2002 | Armstrong | |
| 6,484,578 B2 | 11/2002 | Woodruff et al. | |
| 6,496,449 B1 | 12/2002 | Armstrong | |
| 6,504,527 B1 | 1/2003 | Armstrong | |
| 6,512,980 B1 | 1/2003 | Barr et al. | |
| 6,518,953 B1 | 2/2003 | Armstrong | |
| 6,529,185 B1 | 3/2003 | Armstrong | |
| 6,532,000 B2 | 3/2003 | Armstrong | |
| 6,538,638 B1 | 3/2003 | Armstrong | |
| 6,539,308 B2 | 3/2003 | Monk et al. | |
| 6,559,831 B1 | 5/2003 | Armstrong | |
| 6,563,415 B2 | 5/2003 | Armstrong | |
| 6,576,103 B2 | 6/2003 | Abramovich et al. | |
| 6,662,658 B2 | 12/2003 | Foote | |
| 6,662,659 B2 | 12/2003 | Saitoh | |
| 6,679,118 B1 | 1/2004 | Esashi et al. | |
| 6,693,625 B2 | 2/2004 | Armstrong | |
| 6,705,167 B2 | 3/2004 | Kvisteroey et al. | |
| 6,810,737 B2 | 11/2004 | Kawai | |
| 6,826,960 B2* | 12/2004 | Schaad | G01P 15/18 73/510 |
| 6,845,665 B2 | 1/2005 | Geen | |
| 6,848,304 B2 | 2/2005 | Geen | |
| 6,868,356 B2 | 3/2005 | Nai et al. | |
| 6,883,638 B1* | 4/2005 | Maxwell | G01D 11/245 181/102 |
| 6,891,621 B2 | 5/2005 | Berg et al. | |
| 6,906,700 B1 | 6/2005 | Armstrong | |
| 7,066,026 B2 | 6/2006 | Deng | |
| 7,084,759 B2 | 8/2006 | Cox et al. | |
| 7,104,128 B2 | 9/2006 | Inglese et al. | |
| 7,167,413 B1 | 1/2007 | Rouquette | |
| 7,178,401 B2 | 2/2007 | Byrd | |
| 7,222,534 B2 | 5/2007 | Maas et al. | |
| 7,239,577 B2 | 7/2007 | Tenghamn et al. | |
| 7,254,093 B2 | 8/2007 | Ray et al. | |
| 7,258,011 B2 | 8/2007 | Nasiri et al. | |
| 7,298,672 B1 | 11/2007 | Tenghamn et al. | |
| 7,310,287 B2 | 12/2007 | Ray et al. | |
| 7,345,670 B2 | 3/2008 | Armstrong | |
| 7,359,283 B2 | 4/2008 | Vaage et al. | |
| 7,360,456 B2 | 4/2008 | Morimoto | |
| 7,367,232 B2 | 5/2008 | Vaganov et al. | |
| 7,403,448 B2 | 7/2008 | Welker et al. | |
| 7,474,591 B2 | 1/2009 | Menard et al. | |
| 7,500,395 B2 | 3/2009 | Mori | |
| 7,500,406 B2 | 3/2009 | Morimoto | |
| 7,503,215 B2 | 3/2009 | Berg et al. | |
| 7,561,493 B2 | 7/2009 | Ray et al. | |
| 7,594,438 B2 | 9/2009 | Ackerley et al. | |
| 7,617,727 B2 | 11/2009 | Watson | |
| 7,644,602 B2 | 1/2010 | Umeda | |
| 7,656,746 B2 | 2/2010 | De et al. | |
| 7,673,515 B2 | 3/2010 | Gan et al. | |
| 7,680,620 B2 | 3/2010 | Umeda | |
| 7,881,159 B2 | 2/2011 | Hegna et al. | |
| 7,883,292 B2 | 2/2011 | Thompson et al. | |
| 7,926,614 B2 | 4/2011 | Tenghamn et al. | |
| 7,933,165 B2 | 4/2011 | Thompson et al. | |
| 8,087,848 B2 | 1/2012 | Thompson et al. | |
| 8,117,912 B2 | 2/2012 | Kawakubo et al. | |
| 8,176,779 B2 | 5/2012 | Blomqvist | |
| 8,199,611 B2 | 6/2012 | Goujon | |
| 8,205,498 B2 | 6/2012 | Hsu et al. | |
| 8,226,328 B2 | 7/2012 | Thompson et al. | |
| 8,256,290 B2 | 9/2012 | Mao | |
| 8,266,959 B2 | 9/2012 | Lin | |
| 8,342,025 B2 | 1/2013 | Coronato et al. | |
| 8,351,298 B2 | 1/2013 | De Kok et al. | |
| 8,446,797 B2 | 5/2013 | Olivier et al. | |
| 8,453,506 B2 | 6/2013 | Lu | |
| 8,638,956 B2 | 1/2014 | Deng | |
| 8,674,932 B2 | 3/2014 | Armstrong | |
| 8,675,446 B2 | 3/2014 | Gateman et al. | |
| 9,003,885 B2 | 4/2015 | Pan et al. | |
| 9,075,165 B2 | 7/2015 | Vageskar et al. | |
| 9,081,426 B2 | 7/2015 | Armstrong | |
| 9,086,502 B2 | 7/2015 | Martinez | |
| 9,176,254 B2 | 11/2015 | Johnstad | |
| 9,207,339 B2 | 12/2015 | Beal et al. | |
| 9,213,046 B2 | 12/2015 | Wang | |
| 9,217,808 B2 | 12/2015 | Yoneshima et al. | |
| 9,274,015 B2 | 3/2016 | Schlipf et al. | |
| 9,297,920 B2 | 3/2016 | Manin | |
| 9,310,391 B2 | 4/2016 | Seshia et al. | |
| 9,459,366 B2 | 10/2016 | Henman et al. | |
| 9,488,671 B2 | 11/2016 | Levy | |
| 9,595,833 B2 | 3/2017 | Isfeldt | |
| 9,739,901 B2 | 8/2017 | Marc et al. | |
| 9,770,826 B2 | 9/2017 | Kamiya et al. | |
| 9,778,386 B2 | 10/2017 | Naes et al. | |
| 9,816,886 B2 | 11/2017 | Inazumi | |
| 9,829,594 B2 | 11/2017 | Ray et al. | |
| 9,835,749 B2 | 12/2017 | De Kok et al. | |
| 9,841,434 B2 | 12/2017 | Sonderegger et al. | |
| 9,846,100 B2 | 12/2017 | Klöpper | |
| 9,846,250 B2 | 12/2017 | Rokkan et al. | |
| 9,891,333 B2 | 2/2018 | Valsvik et al. | |
| 9,989,555 B2 | 6/2018 | Keast et al. | |
| 10,274,627 B2 | 4/2019 | Stewart | |

(56) References Cited

U.S. PATENT DOCUMENTS

| | | | |
|---|---|---|---|
| 10,545,254 | B2 | 1/2020 | Faber et al. |
| 2001/0004846 | A1 | 6/2001 | Kawai |
| 2002/0180978 | A1 | 12/2002 | Berg et al. |
| 2003/0079358 | A1 | 5/2003 | Nai et al. |
| 2004/0042341 | A1 | 3/2004 | Tenghamn et al. |
| 2005/0005698 | A1 | 1/2005 | Mcneil et al. |
| 2005/0034519 | A1 | 2/2005 | Deng |
| 2005/0097957 | A1 | 5/2005 | Mcneil et al. |
| 2006/0021436 | A1 | 2/2006 | Kapser et al. |
| 2006/0059991 | A1* | 3/2006 | Pristup ............... G01P 15/11 73/514.39 |
| 2006/0133202 | A1 | 6/2006 | Tenghamn |
| 2006/0219009 | A1 | 10/2006 | Maas et al. |
| 2006/0230829 | A1* | 10/2006 | Byrd ................... G01P 15/18 73/510 |
| 2006/0245300 | A1 | 11/2006 | De Kok et al. |
| 2007/0039387 | A1* | 2/2007 | Jouanet ............... H01H 35/14 73/510 |
| 2007/0073502 | A1 | 3/2007 | Umeda |
| 2007/0295087 | A1 | 12/2007 | Umeda |
| 2007/0297827 | A1 | 12/2007 | Blaine et al. |
| 2008/0177492 | A1* | 7/2008 | Woodmansee ......... G01P 21/00 702/95 |
| 2008/0253225 | A1 | 10/2008 | Welker et al. |
| 2009/0065289 | A1 | 3/2009 | Tenghamm |
| 2009/0217733 | A1* | 9/2009 | Stachow ............... G01P 21/00 73/1.37 |
| 2010/0237870 | A1 | 9/2010 | Dodds |
| 2011/0182140 | A1 | 7/2011 | Lambert et al. |
| 2012/0000287 | A1 | 1/2012 | Frangi et al. |
| 2012/0057430 | A1 | 3/2012 | Rouquette et al. |
| 2013/0083622 | A1 | 4/2013 | Herrmann et al. |
| 2013/0088937 | A1 | 4/2013 | Sykes |
| 2013/0088939 | A1 | 4/2013 | Edme et al. |
| 2013/0163374 | A1 | 6/2013 | Herrmann |
| 2013/0215714 | A1 | 8/2013 | Meunier |
| 2014/0211589 | A1 | 7/2014 | Maxwell |
| 2014/0241122 | A1 | 8/2014 | Ponceau et al. |
| 2014/0247691 | A1 | 9/2014 | Martin |
| 2014/0328138 | A1 | 11/2014 | Lambert et al. |
| 2014/0352431 | A1 | 12/2014 | Leclerc |
| 2015/0049584 | A1 | 2/2015 | Ray et al. |
| 2015/0241215 | A1* | 8/2015 | Kim ..................... G01P 15/18 73/504.12 |
| 2016/0312603 | A1 | 10/2016 | Gottlieb et al. |
| 2016/0341759 | A1* | 11/2016 | Yamaji ................. G01L 9/0054 |
| 2017/0075014 | A1 | 3/2017 | Westerdahl et al. |
| 2017/0123088 | A1* | 5/2017 | Faber ................... G01V 1/3852 |
| 2017/0123091 | A1 | 5/2017 | Stewart |
| 2017/0139070 | A1 | 5/2017 | Marc et al. |
| 2017/0235005 | A1 | 8/2017 | Dons et al. |
| 2018/0304970 | A1 | 10/2018 | Hardcastle |
| 2018/0356550 | A1 | 12/2018 | Morris et al. |
| 2020/0049731 | A1* | 2/2020 | Dahl .................... G01P 15/093 |
| 2020/0008875 | A1 | 3/2020 | Olivier et al. |
| 2020/0166666 | A1* | 5/2020 | Faber ................... G01V 1/3852 |

FOREIGN PATENT DOCUMENTS

| | | | |
|---|---|---|---|
| CN | 1821808 | A | 8/2006 |
| CN | 101057160 | A | 10/2007 |
| CN | 102812382 | A | 12/2012 |
| CN | 103534612 | A | 1/2014 |
| CN | 103547895 | A | 1/2014 |
| CN | 108431637 | A | 8/2018 |
| CZ | 301217 | B6 | 12/2009 |
| EP | 0560558 | A2 | 9/1993 |
| EP | 1292832 | A2 | 3/2003 |
| EP | 2202540 | A2 | 6/2010 |
| EP | 3368923 | A1 | 9/2018 |
| GB | 2411722 | A | 9/2005 |
| GB | 2492642 | A | 1/2013 |
| GB | 2493837 | A | 2/2013 |
| JP | H10256144 | A | 9/1998 |
| JP | 2001-27579 | A | 1/2001 |
| JP | WO2005095998 | A1 | 10/2005 |
| MX | 2018005422 | A | 8/2018 |
| RU | 1806387 | A3 | 3/1993 |
| RU | 28923 | U1 | 4/2003 |
| RU | 2276388 | C1 | 5/2006 |
| SU | 397868 | A1 | 2/1974 |
| SU | 1092446 | A1 | 5/1984 |
| SU | 1187125 | A1 | 10/1985 |
| WO | 96/06328 | A1 | 2/1996 |
| WO | 2011091252 | A2 | 7/2011 |
| WO | 2016170848 | A1 | 10/2016 |
| WO | 2016206094 | A1 | 12/2016 |
| WO | 2017075591 | A1 | 5/2017 |
| WO | 2017075593 | A1 | 5/2017 |
| WO | 2017182994 | A1 | 10/2017 |

OTHER PUBLICATIONS

Jiang, Qi et al. "Simulation and experimental study of a three-axis fiber Bragg grating accelerometer based on the pull-push mechanism," Measurement Science and Technology, Ed. 24, Oct. 16, 2013, 9 pages.

Reichenbach, Ralf et al. "Micromechanical triaxial acceleration sensor for automotive applications," IEEE, Jun. 12, 2003, 4 pages.

Notification on Results of Patentability Check of Invention issued in Russian Patent Application No. 2018119488/28 (030644) dated Jan. 21, 2020, 22 pages including 11 pages of English translation.

"3M Glass Bubbles for Buoyancy and Thermal Insulation: Go Deep." 3M, 4 pages.

International Search Report and Written Opinion issued in International Application No. PCT/US2019/050934, dated Nov. 26, 2019, 17 pages.

Office Action dated Nov. 26, 2019 in connection with Danish Patent Application No. PA201870583, 5 pages.

Office action dated Sep. 29, 2019, in connection with Chinese Patent Application No. 201780023806.4, 9 pages.

First Office Action dated Jun. 11, 2019 in connection with Chinese Patent Application No. 201680077142.5, 20 pages including English translation, Jun. 11, 2019.

First Office Action dated Jul. 18, 2019 in connection with Chinese patent application No. 201680077098.8, 28 pages including English translation., Jul. 18, 2019.

"International Search Report & Written Opinion", dated Feb. 12, 2015, in PCT Application No. PCT/US2014/057784, 10 Pages.

Aldcroft, T.L. et al., "Six-degree-of-freedom vibration isolation systems with application to resonant-mass gravitational radiation detectors," Rev. Sci. Instrum. 63 (8), Aug. 1992, pp. 3815-3827, 13 pages.

Amarasinghe, Ranjith et al., "A Silicon Micromachined Six-Degree of Freedom Piezoresistive Accelerometer," IEEE, 2004, pp. 852-855, 5 pages.

Amarasinghe, Ranjith et al., "Design & Fabrication of Piezoresistive Six Degree of Freedom Accelerometer for Biomechanical Applications," 2004 IEEE, International Conference on MEMS, NANO and Smart Systems, Aug. 2004, Banff, Alberta, Canada, 10 pages.

Amarasinghe, Ranjith et al., "Design and fabrication of a miniaturized six-degree-of-freedom piezoresistive accelerometer," J. Micromech. Microeng. 15 (2005), pp. 1745-1753, 9 pages.

Chen, Jeng-Heng et al., "Gyroscope Free Strapdown Inertial Measurement Unit by Six Linear Accelerometers," Journal of Guidance, Control, and Dynamics, vol. 17, No. 2, Mar.-Apr. 1994, pp. 286-290, 5 pages.

Danish PTO, First Examination Report dated Feb. 15, 2017 in connection with Danish Patent Application No. PA 2016 70237, 9 pages.

D'Spain et al. "Trip Report—Aug. 1987 Swallow Float Deployment with Rum." Marine PHysical Laboratory, Scripps Institution of Oceanography, San Diego, California. Jan. 1988, 93 pages., Jan. 1, 1988.

(56) References Cited

OTHER PUBLICATIONS

Dubuque, "A Lumped Parameter Equilibrium Model of a Submerged Body with Mooring Lines." Theses for Master of Science in Mechanical Engineering, University of Washington, 2011, 123 pages., Aug. 8, 2011.
EENTEC, "Force Balanced Accelerometer Model EA-120," obtained Jul. 5, 2016 from <http://www.eentec.com/EA-120_data_new.htm>, 3 pages.
EENTEC, "High Resolution Rotation Seismometer, Model R-1," obtained Jul. 5, 2016 from <http://www.eentec.com/R-1_data_new.htm>, 3 pages.
Elboth, Thomas "Noise in Marine Seismic Data", Series of Dissertations submitted to the Faculty of Mathematics, and Natural Sciences, University of Oslo, Norway, Ch. 9 removed, 141 pages.
Geng, Z. Jason et al., "Six Degree-of-Freedom Active Vibration Control Using the Stewart Platforms," IEEE Transactions On Control Systems Technology, vol. 2, No. 1, Mar. 1994, pp. 45-53, 9 pages.
Ho, et al., "Design and Implementation of a 12-Axis Accelerometer Suite." The 2009 IEEE/RSJ International Conference on Intelligent Robots and Systems. Oct. 11-15, 2009, St. Louis, USA. pp. 2197-2202., Oct. 11, 2009.
International Search Report and Written Opinion dated Feb. 7, 2017 in connection with International Patent Application No. PCT/US2016/059723, 13 pages.
International Search Report and Written Opinion dated Feb. 7, 2017 in connection with International Patent Application No. PCT/US2016/059725, 13 pages.
Jiang, Qi et al., "Simulation and experimental study of a three-axis fiber Bragg grating accelerometer based on the pull-push mechanism," Meas. Sci. Technol. 24 (2013), 9 pages.
Lewis, et al., "Converted Shear Waves as Seen by Ocean Bottom Seismometers and Surface Buoys." Bulletin of the Seismological Society of America, vol. 67, No. 5, Oct. 1977, pp. 1291-1302., Oct. 1, 1977.
Lobecker, et al., "Real Time Oceanographic Data From Georges Bank." Raytheon Environmental and Oceanographic Services. Portsmouth, R.I., pp. 536-546.
McConnell, "Development of a Pressure-Acceleration Underwater Acoustic Intensity Probe," paper, Apr. 17-18, 2001, 13 pages, Acoustech Corporation, State College, PA.
Nigbor, Robert L., "Six-Degree-of-Freedom Ground-Motion Measurement," Bulletin of Seismological Society of America, vol. 84, No. 5, pp. 1665-1669, Oct. 1994, 5 pages.
Ramotowski, et al., "NUWC XP-1 Polyurethane-Urea: A New, "Acoustically Transparent" Encapsulant for Underwater Transducers and Hydrophones." pp. 227-230.
Reichenbach, Ralf et al., "Micromechanical triaxial acceleration sensor for automotive applications," IEEE 2003, pp. 77-80.
Wang, Yi et al., "What comes up must have gone down: the principle and application of Up-Down Deconvolution for Multiple Attenuation of Ocean Bottom Data," CSEG Recorder, Dec. 2009, pp. 16-20.
Chinese Office Action for Application No. 201680077142.5 dated Jul. 21, 2020.
Australian Government, Examination Report for Application 2016344004, dated Aug. 13, 2021.
Australian Government, Examination Report for Application 2016344004, dated Sep. 7, 2021.
European Patent Office, Examination Report for Application 16794487.5 dated Oct. 28, 2021.

\* cited by examiner

MULTI-AXIS, SINGLE MASS ACCELEROMETER

CROSS REFERENCE TO RELATED APPLICATIONS

This application claims the benefit of priority pursuant to 35 U.S.C. § 119(e) of U.S. provisional application No. 62/730,598 filed 13 Sep. 2108 entitled "Multi-Axis, Single Mass Accelerometer," which is hereby incorporated by reference herein, in its entirety.

TECHNICAL FIELD

This application relates generally to motion sensors and inertial navigation systems. In exemplary implementations, the technology may be incorporated into seismic data acquisition and sensor systems for marine seismic surveys, including, but not limited to, ocean bottom cables and autonomous seismic node applications.

BACKGROUND

Seismic survey technologies are commonly used to explore and develop resources for the petrochemical industry. Petrochemical products are ubiquitous in the modern economy, and may be found in everything from oil and gasoline to medical devices, children's toys, and a wide range of other everyday household items. To meet the continuing demand for these products, oil and gas reserves must be accurately located and surveyed, so that these important resources can be effectively managed. As a result, there is an ongoing need for new seismic sensor systems and more advanced exploration technologies.

Scientists and engineers typically utilize seismic wave-based exploration techniques to locate new oil and gas reservoirs, and to survey and manage existing reserves over time. Seismic surveys are performed by deploying an array of seismic sensors or receivers over the region of interest, and monitoring the response to controlled emission of seismic energy via seismic sources such as vibrators and air gun arrays, or explosive detonations. The response depends upon the seismic energy reflected from subsurface structures, allowing the corresponding geological features to be imaged, including mineral reservoirs and other underground structures of interest.

Marine seismic surveys may proceed by towing an array of seismic sensors or receivers behind a survey vessel, with the receivers distributed along one or more streamer cables. A set of air guns or other seismic sources is used to generate seismic energy that propagates down through the water column to the ocean floor (or other bottom surface). A portion of the seismic energy penetrates the ocean floor and is reflected from subsurface structures, then returns back through the water column to be detected in the streamer array. Seismic receivers can also be disposed along ocean-bottom cables, or provided in the form of individual, autonomous seismic nodes distributed on the seabed.

Typical seismic receivers include pressure sensors and particle motion detectors, which can be provided as individual sensor components, or combined together with both sensor types located in close proximity within a receiver module or seismic node. For example, a set of pressure sensors can be configured in a hydrophone array, and adapted to record scalar pressure measurements of the seismic wavefield propagating through the water column or other seismic medium. Particle motion sensors include accelerometers and geophones, which can be configured to provide single-axis or three-dimensional vector velocity measurements that characterize motion of the medium in response to propagating seismic waves.

Geophysical data pertaining to the subsurface structures is acquired by observing the reflected seismic energy with an array of such receiver components. The observed seismic signals are used to generate a seismic image that describes the subsurface geology and composition in and around the survey area. The overall image quality depends not only on signal sensitivity but also on noise effects, contributing to the constant demand for more advanced sensor and receiver technologies.

The information included in this Background section of the specification, including any references cited herein and any description or discussion thereof, is included for technical reference purposes only and is not to be regarded as subject matter by which the scope of the invention as defined in the claims is to be bound.

SUMMARY

This application is directed to a multi-axis, single mass particle motion sensor or accelerometer, suitable for use in seismic surveys as well as other applications in which accelerometers may be used, including vehicle navigation (e.g., aviation, marine vessels, and motor vehicles), technical device sensors, consumer device sensors, etc. In an example implementation, a plurality of sensor components may be coupled to a single central mass, providing sensitivity to translational motion in three independent directions, and sensitivity to rotational acceleration about three orthogonal axes. The individual sensor components may be configured to sense the corresponding translational and rotational motions based on dynamic coupling to the mass, including, but not limited to, force-sensitive translational couplings and rotational couplings. The translational and rotational couplings may be preferentially sensitive to either acoustic waves or shear effects, providing for a combined sensor signal with improved vector fidelity, as described herein.

In some embodiments, a seismic sensor comprises a housing or frame and a central mass disposed within the frame. The central mass may be defined by three principal axes. A plurality of transducers may be mechanically coupled between the frame and the central mass, and arranged in pairs positioned on opposing sides of the central mass, along each of the three principal axes. Depending on application, piezoelectric crystal transducers may be used as the sensing element, with crystals aligned to provide signal sensitivity to shear stress. Electronics may be provided to combine signals from the transducers in each pair in order to generate output characterizing translational and rotational acceleration of the frame.

In one exemplary implementation, a multi-axis, single mass acceleration sensor includes a three-dimensional frame, a test mass, a plurality of transducers, and a plurality of struts. The test mass may be disposed within and spaced apart from the frame. The transducers are mechanically coupled to the frame at a plurality of respective locations on the frame. The struts are configured to couple to the central mass at a plurality of respective positions, respectively, and to couple with respective sets of the transducers at the plurality of respective locations, thereby suspending the test mass within the frame. The sensor is thus responsive to translational motion in multiple independent directions and to rotational motion about multiple independent axes.

In another exemplary implementation, a multi-axis, single mass acceleration sensor includes a three-dimensional frame, a hollow, spherical test mass with three orthogonal principal axes, six pairs of shear crystals, and six suspension blades. The test mass is disposed within and spaced apart from the frame. The shear crystals are mechanically coupled to the frame. The suspension blades are each coupled at a center portion to the central mass normal to opposite ends of each of the three orthogonal principal axes, respectively, and coupled with a respective pair of shear crystals at each lateral end of the suspension blades, thereby suspending the test mass within the frame. The sensor is oriented with respect to three orthogonal principal axes that each pass through a center of mass of the test mass. The sensor is thus responsive to translational motion parallel to the three orthogonal principal axes and to rotational motion about the three orthogonal principal axes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description, including various representative embodiments of the invention, and as illustrated in the accompanying drawings.

DETAILED DESCRIPTION

In this disclosure, reference is made to examples and embodiments of the invention. However, it should be understood that the invention is not limited to these or any other specifically described embodiments. Any combination of the disclosed features and elements, whether related to different embodiments or not, is contemplated to implement and practice the invention. Furthermore, in various examples and embodiments the invention provides numerous advantages over the prior art. Although certain embodiments may achieve these and other advantages over other potential solutions, and over the prior art, whether or not a particular advantage is achieved by any given embodiment is not limiting of the invention as claimed. The following examples, aspects, features, embodiments and advantages of the disclosure are merely illustrative, and should not be considered elements or limitations of the claims, except where explicitly specified in the claim language. Likewise, references to "the invention" shall not be construed as a generalization of any inventive subject matter that is disclosed, and shall not be construed to represent an element or limitation of any claim except where expressly recited therein.

Multi-Axis, Single Mass Sensors

Figure 6:
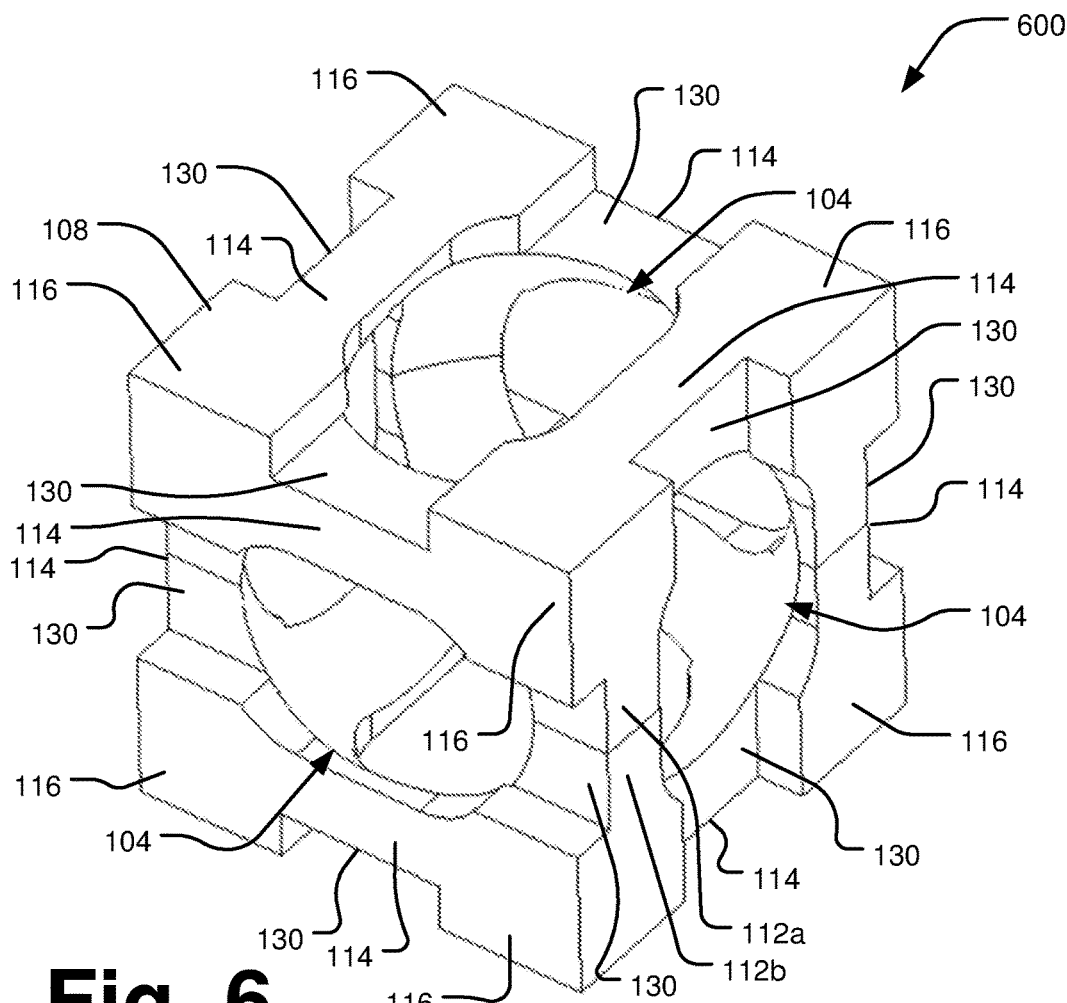
FIG. 6 is an isometric view of the frame of the multi-axis, single mass accelerometer of FIG. 1.
Figure 7:
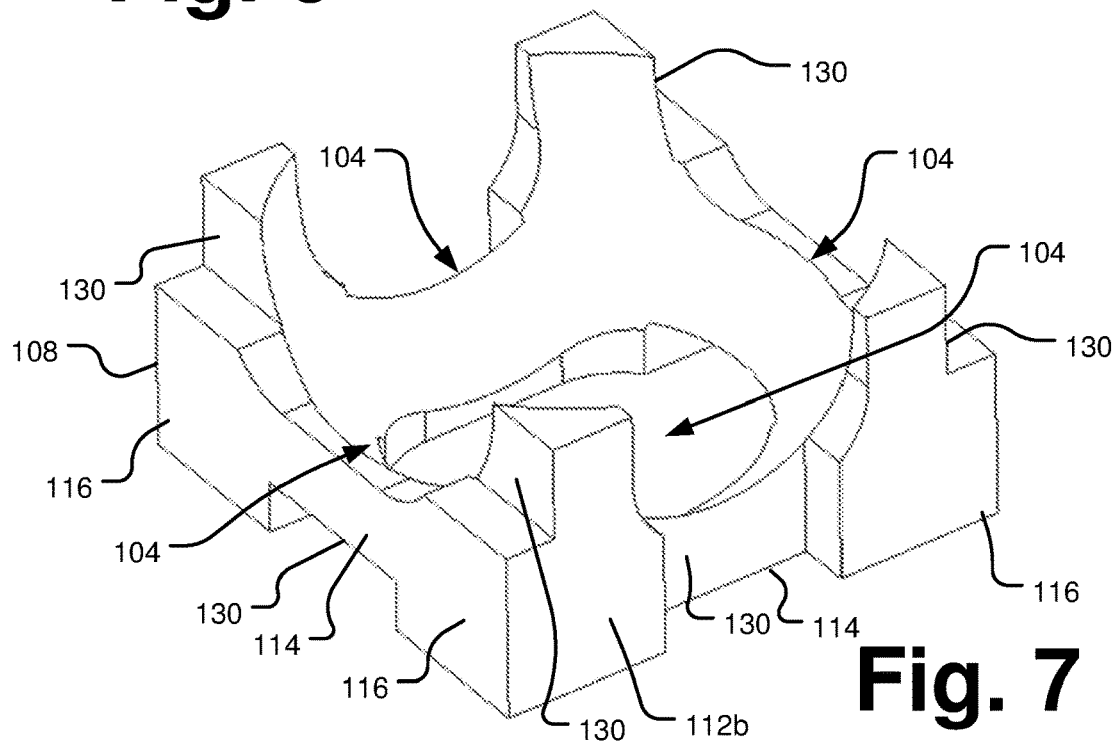
FIG. 7 is an isometric view of a bottom half of the frame of FIG. 6.

An implementation of a multi-axis, single mass accelerometer 100 is depicted in accompanying FIGS. 1-5. The accelerometer 100 is configured to detect both translational and rotational acceleration. The accelerometer 100 is principally composed of a test body or test mass 102 housed by, suspended within, and connected to a frame 108 through a plurality of sensors 106. (Note: in the figures the sensors are labeled 106a1-106f2; however, indication of all the sensors collectively in this discussion may be made merely by reference to "sensors 106.") The frame 108 provides a reference structure for measurement by the sensors 106 of the inertial resistance of the mass 102 to acceleration of the frame 108 when subjected to external stimulus or energy. The frame 108 may define six flat faces or sides 110 forming a cube around the mass 102. Such a frame 108 may be formed as a monocoque or similar structural shell component, machined from a suitable metal material, ceramic (e.g., a MACOR material), or from another material with suitable rigidity and other mechanical properties. The frame 108 should be extremely stiff and should withstand deformation under typical forces and loads to be experienced by the accelerometer 100. In one exemplary implementation the frame 108 may be machined out of brass. In the embedment shown in FIGS. 1-5, the frame 108 is of two-part construction consisting of a first half 112a and a second half 112b, shown to better advantage in FIGS. 6 and 7. Each of the first and second halves 112a, 112b may be machined with threaded shafts to receive screws or other fasteners to fix the first and second halves 112a, 112b.

A central aperture 132 may be formed in each of the side faces 110 of the frame 108 defined and surrounded by a plurality of lateral pillars or beams 114 extending between corner structures 116 to provide a perimeter framework for a cubic frame 108. The central apertures 132 may be oblong in shape as shown, but may be formed in any other shape (e.g., square, octagonal, etc.) sufficient in size (area) to expose a surface of the test mass 102 for structural connection with the sensors 106. In symmetric embodiments, the beams 114 and corner structures 116 may be similarly formed to be substantially identical in size, thickness, and construction. One exterior surface of each of the beams 114 may be recessed to form a pocket 130. Opposing beams 114 may define a pair of pockets 130 on each face 110 of the frame 108. The orientation of each pair of pockets 130 on a face 110 is orthogonal to pairs of pockets 130 on each adjacent face 110 and parallel to the orientation of the pockets 130 on the opposing face 110 of the frame 108. Interior surfaces of the frame 108 may be machined to match a curvature of the form of the test mass 102 in order to provide a close tolerance between the frame 108 and the test mass 102 to maintain a uniform separation distance between the interior surfaces of the frame 108 and the test mass 102 suspended therein. Alternatively, the interior surfaces of the frame 108 need not be machined for close tolerances and the separation distances between various of the interior surfaces of the frame 108 and the test mass 102 suspended therein can be different. However, the test mass 102 is typically centered within the frame 108.

In some implementations, the test mass 102 may be a hollow sphere, for example, made of a relatively dense or "heavy" material, i.e., a material with a high specific gravity to provide a significant moment of inertia relative to the size of the test mass 102, particularly when the accelerometer 100 is small in size, e.g., less than 3 cm. In exemplary embodiments, the test mass 102 may be made of brass or titanium formed as hollow spheres with uniform wall thickness comprising the mass. In some embodiments, areas on a spherical mass may be flattened to aid in attachment of the test mass 102 to the frame 108. In such embodiments in which the density of the test mass 102 is not uniform (e.g., due to variations in surface form or wall thickness, or both), it is desirable that the mass distribution of the test mass 102 be symmetrical. As rotational movement is to be measured, the polar moment of inertia of the test mass 102 is an additional factor to consider in the design of the test mass 102. The size, mass, and density of the test mass 102 may thus be selected to optimize the response characteristics for both translational and rotational acceleration sensitivity. Depending upon the type of acceleration to be measured, the characteristics of the test mass 102, as well as the frame 108, may be tuned to be sensitive in desired frequency bandwidths while attenuating undesired bandwidths.

Other configurations of the test mass 102 are also possible; for example, a solid sphere or multifaceted shape (e.g., a symmetrical polyhedron) having symmetry about axes X, Y, and Z. Generally, shapes that are symmetrical about one or more axes of translation or rotation are suited for achieving the desired sensory results in an accelerometer, as described herein. In other implementations, the test mass 102 may be solid rather than hollow, and formed either of a single substantially uniform material or from one or more different types of core materials and additional layers or components that build out to the outer layer or outer surface of the test mass 102. The determinations of whether the body of the mass 102 should be hollow or solid, and homogenous or made of multiple materials and layers, are design choices made to achieve the dynamic requirements of both translational and angular acceleration measurements for a particular environment or application.

Depending on embodiment, one or both of the test mass 102 and the outer surface thereof may be formed of an electrically conductive material in order to provide a conductive path for connection with an electrode of a sensor or transducer as described herein. For example, the test mass 102 may be formed as a solid or hollow sphere of aluminum, brass, copper, beryllium copper, or other conductive material, or the test mass 102 may be formed of a ceramic or other insulating material with a conductive coating on the outer surface (e.g., in a gold, aluminum, or other conductive metal plated configuration).

Alternatively, one or both of the test mass 102 and the outer surface of the test mass 102 may be made of a nonconductive or electrically insulating material, e.g., to reduce the effect of stray capacitance on the signal-to-noise (S/N) ratio of the accelerometer 100, e.g., caused by the conductive area of the test mass 102. For example, the test mass 102 may be formed as a solid or hollow sphere of a machinable ceramic (e.g., a MACOR material), or from an injection molded plastic.

As shown in FIGS. 1-5, the test mass 102 may be attached to a number of sensors 106 by a number of braces or struts. In an exemplary implementation, these struts may be formed as flat, blade-like structures, hereinafter referred to as suspension blades $120a$-$120f$, that attach to the sensors 106 at lateral ends and to the test mass 102 at a center location along the length of each suspension blade $120a$-$120f$. The sensors 106 are mounted at various locations on the frame 108. In the embodiment shown in FIGS. 1-5, in order to aid in attachment to the suspension blades $120a$-$120f$, the spherical test mass 102 may be formed with a number of planar coupling surfaces 104, wherein each attachment surface 104 is at a radial distance from the center of the spherical test mass 102 less than the radius of the spherical test mass 102. If determination of translational and rotational accelerations is desired with respect to more than one independent direction, the transducers may be disposed along independent (e.g., transverse or orthogonal) axes X, Y, and Z. In the embodiment of FIGS. 1-5, six planar coupling surfaces 104 are formed in opposing pairs on the outer surface of the test mass 102, aligned with opposing ends of the three orthogonal axes X, Y, and Z having an origin at the center of the test mass 102; and thus an axis between each opposing pair is orthogonal to axes extending between each of the other opposing pairs. The coupling surfaces 104 provide a bonding and alignment surface for attachment of the suspension blades $120a$-$120f$. Additionally, an insulator 134, e.g., a ceramic pad, may be placed between the coupling surfaces 104 and respective suspension blades $120a$-$120f$ in order to provide electrical isolation between the test mass 102 and the sensors 106. The suspension blades $120a$-$120f$ may be fixed to respective coupling surfaces (with or without an insulator 134) via an adhesive or other bonding agent (e.g., a metal weld if both the test mass 102 and suspension blades $120a$-$120f$ are metals capable of welding and electric isolation is not necessary).

Figure 4:
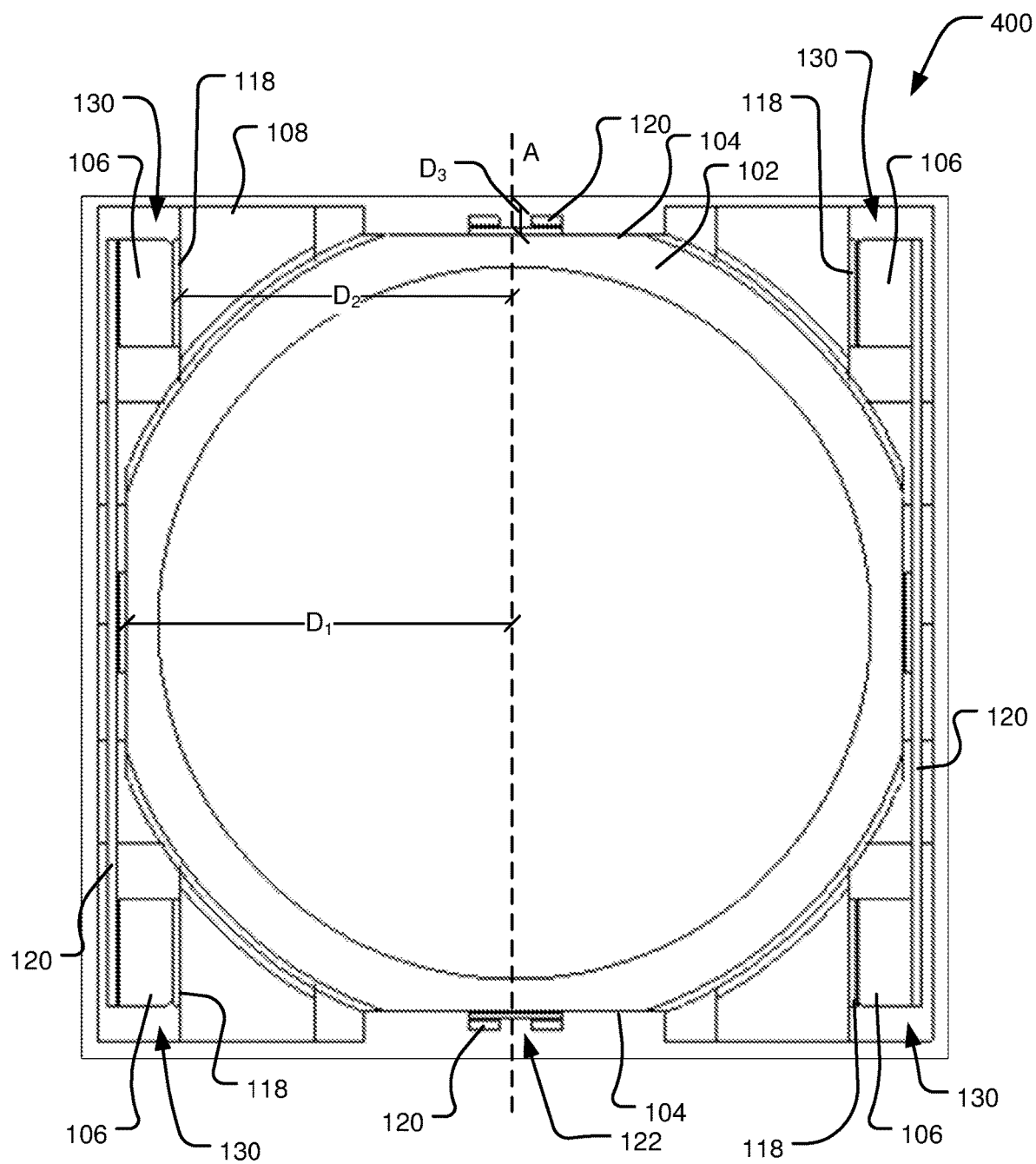
FIG. 4 is an elevation view in cross-section along line 4-4 of FIG. 1 of the multi-axis, single mass seismic accelerometer of FIG. 1.
Figure 5:
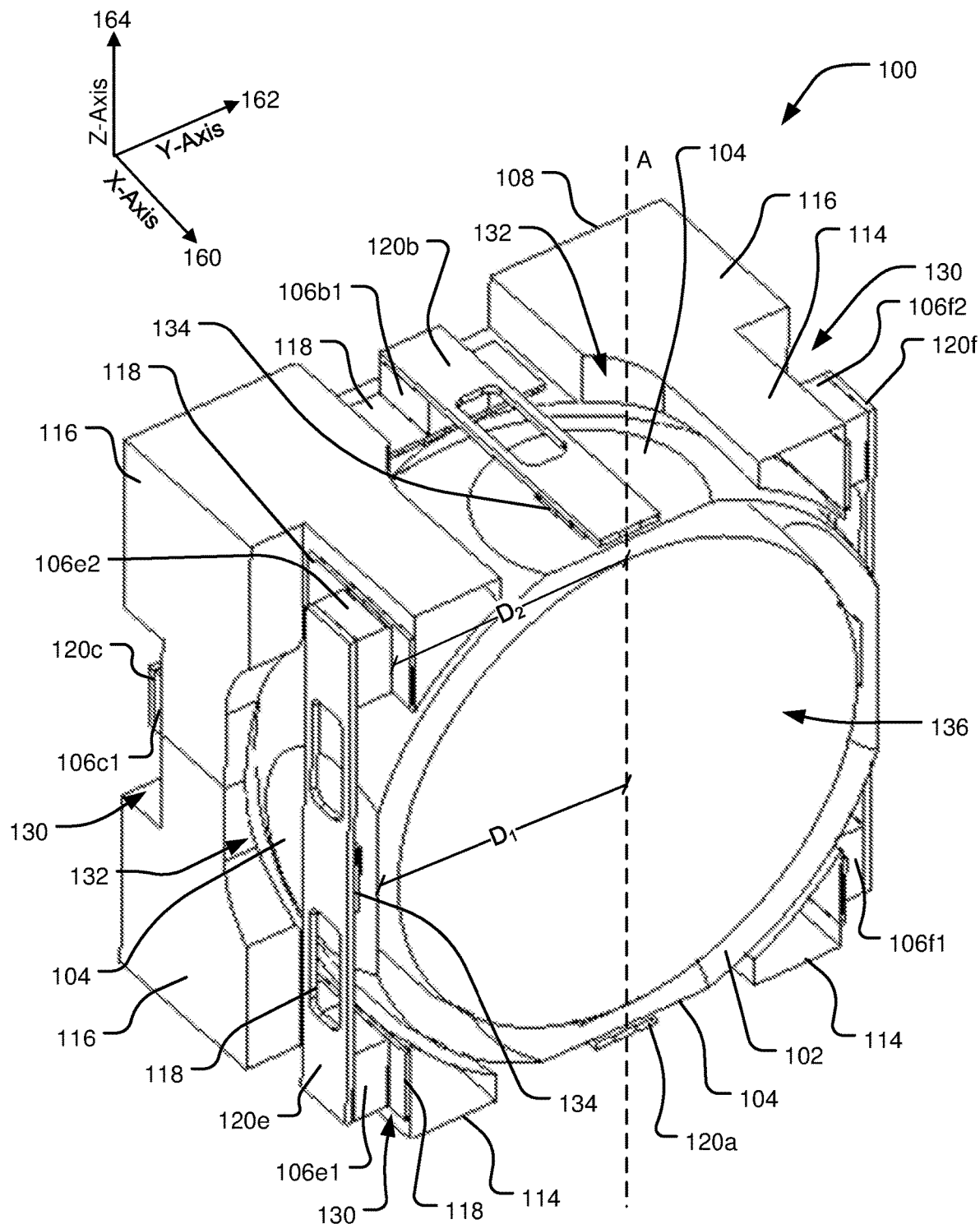
FIG. 5 is an isometric view of FIG. 4 of the multi-axis, single mass seismic accelerometer of FIG. 1.

In the embodiment shown in FIGS. 1-5, for example, twelve (12) individual sensors $106a1$-$106f2$ are arranged in six sets of laterally opposing pairs coupled to attachment surfaces in respective pockets 130 within the frame 108. An insulator 118, e.g., a ceramic pad, may be placed between the attachment surfaces of each of the pockets 130 and respective sensors $106a1$-$106f2$ in order to provide electrical isolation between the sensors 106 and the frame 108. In one embodiment, the insulators 118 may be one-sided such that an outer side coupled to the sensors 106 is conductive to provide a connection for an electrical lead while the inner side connected to the attachment surfaces of the pockets 130 of the frame 108 are nonconductive. The test mass 102 is oriented within the frame 108 such that the planar coupling surfaces 104 are each respectively parallel to a respective face 110 of the frame 108 and, consequently, to a corresponding pair of pockets 130 on the respective face 110. However, as shown in FIGS. 4 and 5, the depth of each pair of pockets 130 may be greater than the depth of the coupling surfaces 104 with respect to a corresponding parallel axis A centered within the test mass 102 (i.e., one of the axes X, Y, or Z) such that a distance D1 between the coupling surface 104 and the axis A is greater than a distance D2 between the attachment surfaces of the pockets 130 and the axis A.

As shown in FIGS. 1-5, for example, twelve acceleration sensors 106a1, 106a2, 106b1, 106b2, 106c1, 106c2, 106d1, 106d2, 106e1, 106e2, 106f1, and 106f2 are affixed to laterally opposed pockets 130 on each face 110 of the frame 108, in order to sense translational and rotational motion of the frame 108 with respect to the test mass 102 in the three orthogonal directions defined by perpendicular axes X, Y and Z. In particular implementations, piezoelectric crystal transducers 106a1-106f2 may be used to measure the locally-defined stress response due to translation and rotation of the frame 108 about the test mass 102, e.g., in response to external torques and forces due to incident energy (e.g., physical motion, acoustic waves, seismic energy, etc.). The force transducers or acceleration sensors 106a-106f may be chosen to be highly sensitive or tuned to measure specific types or bandwidths of incident energy imparted to or experienced by the acceleration sensor in order to suitably characterize the response of the test mass 102 to the incident energy to be measured.

In such a configuration, it may be advantageous to select a piezoelectric transducer such as an acceleration sensor 106a-106f that is configured to react to shear stress on opposing sides of the piezoelectric crystal device. Suitable transducer configurations include, but are not limited to, lead magnesium niobate-lead titanate (PMN-PT) shear mode crystals (e.g., available from CTS Corporation) and piezoelectric accelerometer sensor (PAS) elements. Such a transducer registering or responsive to shear stress may provide greater sensitivity than alternatives due to the configuration of the test mass 102 within the frame 108 and the goal of measuring relative acceleration between the two. In some exemplary implementations, the transducer may be a single relaxor ferroelectric crystal, for example, a PMN-PT crystal, or other suitable transducer. The crystal responses are substantially flat with respect to frequency. This occurs because the crystal resonance is significantly out of the frequency bands of interest.

Piezoelectric elements fabricated from single crystals can exhibit superior sensing properties, relative to polycrystalline elements. Single crystal transducers can also be relatively insensitive to temperature effects, and may have high mechanical energy to electrical energy conversion factors. If a single crystal is cut transverse to the orientation of the crystal alignment, at an appropriate angle, e.g., as done by CTS Corporation in the manufacture of their <111> poled transverse shear single crystals, a transducer highly responsive to preferred shear loads and stresses (as opposed to tension or compression loads and stresses or off-axis shear loads and stresses) may be formed. In some particular embodiments, the sensors 106 may be shear-mode piezoelectric transducers, for example, oblong, rectangular, or similarly-shaped single crystal transducers with dimensions of about 3.5 mm×2 mm×1 mm. More generally, the shape and dimensions of the crystals forming the sensors 106 can vary, either individually or as a set, depending on application.

Figure 8A:
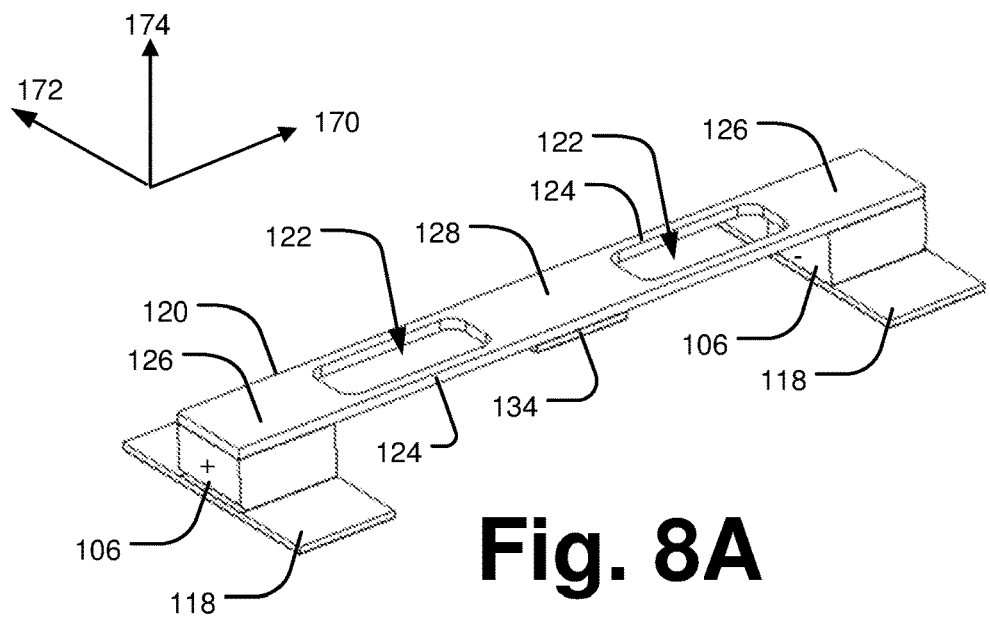
FIG. 8A is an isometric view of a suspension blade connected to a pair of sensors and insulators of the multi-axis, single mass accelerometer of FIG. 1 in isolation.
Figure 8B:
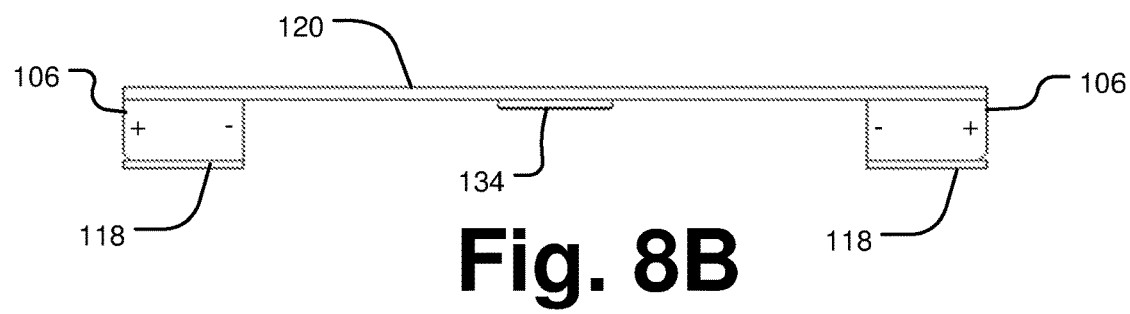
FIG. 8B is a front elevation view of the suspension blade, sensors, and insulators of FIG. 8A.

Three sets of two pairs each of piezoelectric transducer sensors 106a1-106f2 can each be mounted (e.g., using a conductive adhesive) onto one-sided insulating material previously fixed to the pockets 130 of the frame 108. Pairs of the sensors 106 on a single face 110 may be connected together and to the test mass 102 by suspension blades 120a-120f. The suspension blades 120a-120f are shown in greater detail in FIGS. 8A and 8B. Each suspension blade 120 may be formed (e.g., stamped or cut) out of a flat sheet of beryllium copper or similar material with good conductivity and a high ratio of tensile modulus to tensile yield. The suspension blades 120 may be formed as shown as elongate, rectangular blades with two apertures 122 formed therein. The apertures 122 may be oblong or elongate. The apertures 122 separate two lateral sensor contact areas 126 from a center mass coupling area 128. Each of the sensor contact areas is affixed (e.g., with conductive adhesive) to one of the sensors 106 in each pair of sensors on a face 110. The mass coupling area 128 is similarly connected to one of the coupling surfaces 104 on the test mass 102.

It may be preferable that the suspension blades 120 be electrically isolated from the test mass 102. Therefore, a rigid insulating material 134 (e.g., a ceramic pad) may be placed and adhered between the suspension blades 120 and the test mass 104. The insulating material 134 is preferably rigid in order to transfer energy between the frame 108 and the test mass 102 without attenuation. The sensor blades 120 are designed to be stiff or rigid along their longitudinal direction, parallel to the sensing axis 170 between each pair of sensors 106 on a respective face 110 of the frame 108. However, the suspension blades 120 are also designed to be relatively softer or less stiff along the non-sensing axes 172 and 174. This configuration results in greater response to translational forces along the sensing axes 170 of each respective sensing blade 120. This structural response is effectuated by the removal of material to form the apertures 122, leaving narrow beams 124 of material along the edges of the suspension blades 120.

The result of this design is the generation of relatively high mechanical shear stress on the sensors 106 in the principal or primary sensing direction, e.g., along the longitudinal dimension 170 of the corresponding suspension blades 120. Conversely, there may be lower shear stress in the cross-axis directions relative to the primary sensing direction, reduced by the absorption of the shear stress by the suspension blades 120 in the transverse directions. As noted above, the sensors 106 mounted between the suspension blades 120 and the frame 108 are responsive to shear stress, which manifests in a plane defined by the sensing axis 170 and the non-sensing axis 174 extending outward from a center of mass of the test mass 102 normal to the longitudinal sensing axis 170 of the respective suspension blade 120. Thus, as a force impacts the frame 108, a relative acceleration with respect to the test mass 102 arises and the crystal sensors 106 on each end of the suspension blade skew in the plane defined by axes 170, 174, which is the manufactured shear sensing plane of the crystal sensors 106, and a voltage is generated.

The configuration of the suspension blades 120 also reduces the impact of "crosstalk" from the principal sensor axis 170 to the other independent axes 172, 174. The construction of accelerometer 100 thus increases sensitivity by augmenting the effects of the crystal orientation properties of the individual sensors 106 in order to produce relatively more voltage when stressed in their preferred sensing direction, and to reduce off-axis effects in order to achieve a desired level of vector fidelity. More specifically, the accelerometer 100 is configured to generate a consistent representation of the acceleration or impulse along each independent measurement axis, regardless of sensor orientation. The accelerometer 100 is also configured to substantially reduce the response to an impulse along one particular sensor axis, as observed by the other two independent (orthogonal) axes. This improves the vector fidelity by providing a more accurate representation of the actual (physical) vector wavefield observed at the accelerometer 100, while reducing non-physical sensor response effects.

Sensor Configurations

As described above, the test mass 102 may have parallel planar coupling surfaces 104 disposed at opposite ends of the orthogonal axes X, Y, Z, and each face 110 of the frame 108 has pockets 130 positioned on lateral sides of the coupling surfaces sized to receive the sensors 106, which may be mounted therein using an adhesive or other mechanical attachment. A first pair of sensors 106a1, 106a2 (e.g., piezoelectric crystal transducers) are mounted on opposing sides of the mass 102 and spaced along the linear sense axis 170, in this case the horizontal X-axis 160, on a first face 110; and a second pair of sensors 106b1, 106b2 are mounted on opposing sides of the mass 102 and spaced along the horizontal X-axis on a second, opposing face 110. The piezoelectric crystals in each pair of sensors are mounted in opposite crystal orientations such that, for example, the positive output for shear sensitivity of the first sensor 106a1 is along the X-axis but in the opposite direction (not orthogonal) to the positive output for shear sensitivity of the second sensor 106a2. On the opposite face 110 of the frame 108, the positive output for shear sensitivity of the third sensor 106b1 is along the X-axis in the opposite direction (not orthogonal) to the positive output for shear sensitivity of the fourth sensor 106b2. In addition, the orientations of the third and fourth sensors 106b1, 106b2 are arranged parallel to and mirror the orientations of the first and second sensors 106a1, 106a2, such that the positive output of the first sensor 106a1 is in the same direction as the positive output of the third sensor 106b1, and the positive output of the second sensor 106a2 is in the same direction as the positive output of the fourth sensor 106b2. This set of four sensors 106a1-106b2 jointly create a translational accelerometer along the horizontal X-axis and a rotational accelerometer with sensitivity to rotation about the Y-axis.

A second set of sensors 106c1-106d2 may be similarly mounted on faces 110 of the frame 108 on opposing ends of the X-axis and oriented parallel to the Y-axis 162, such that the sense axis 170 of the sensors 106c1-106d2 is rotated perpendicular to that of the first set of transducers 106a1-106b2. The piezoelectric crystals in each pair of sensors are mounted in opposite crystal orientations such that, for example, the positive output for shear sensitivity of the fifth sensor 106c1 is along the Y-axis but in the opposite direction (not orthogonal) to the positive output for shear sensitivity of the sixth sensor 106c2 (not visible in figures). On the opposite face 110 of the frame 108, the positive output for shear sensitivity of the seventh sensor 106d1 is along the Y-axis in the opposite direction (not orthogonal) to the positive output for shear sensitivity of the eighth sensor 106d2. In addition, the orientations of the seventh and eighth sensors 106d1, 106d2 are arranged parallel to and mirror the orientations of the fifth and sixth sensors 106c1, 106c2, such that the positive output of the fifth sensor 106c1 is in the same direction as the positive output of the seventh sensor 106d1, and the positive output of the sixth sensor 106c2 is in the same direction as the positive output of the eighth sensor 106d2. This set of four sensors 106c1-106d2 jointly create a translational accelerometer along the Y-axis and a rotational accelerometer with sensitivity to rotation about the Z-axis.

A third set of sensors 106e1-106f2 may be mounted on faces 110 of the frame 108 on opposing ends of the Y-axis. A fifth pair of sensors 106e1, 106e2 are mounted on opposing sides of the mass 102 and spaced along the linear sense axis 170, in this case the Z-axis 164, on a fifth face 110; and a sixth pair of sensors 106f1, 106f2 are mounted on opposing sides of the mass 102 and spaced along the Z-axis on a sixth, opposing face 110. The piezoelectric crystals in each pair of sensors are mounted in opposite crystal orientations such that, for example, the positive output for shear sensitivity of the ninth sensor 106e1 is along the Z-axis but in the opposite direction (not orthogonal) to the positive output for shear sensitivity of the tenth sensor 106e2. On the opposite face 110 of the frame 108, the positive output for shear sensitivity of the eleventh sensor 106f1 is along the Z-axis in the opposite direction (not orthogonal) to the positive output for shear sensitivity of the twelfth sensor 106f2. In addition, the orientations of the eleventh and twelfth sensors 106f1, 106f2 are arranged parallel to and mirror the orientations of the ninth and tenth sensors 106e1, 106e2, such that the positive output of the ninth sensor 106e1 is in the same direction as the positive output of the eleventh sensor 106f1, and the positive output of the tenth sensor 106e2 is in the same direction as the positive output of the twelfth sensor 106f2. This set of four sensors 106e1-106f2 jointly create a translational accelerometer along the Z-axis and a rotational accelerometer with sensitivity to rotation about the X-axis. Thus, the orientation of each set of four sensors 106a1-106b2; 106c1-106d2; 106e1-106f2 may be orthogonal to that of the other sets, e.g., where the pairs of respective crystals are mounted with their sense axes 170 oriented in parallel to the X, Y, and Z axes (160, 162, and 164), respectively.

In other embodiments, the pairs of sensors 106 on each side of the mass 102 may be oriented in the same direction. In this configuration, the piezoelectric crystals in each pair of sensors are mounted in the same crystal orientations (i.e., the crystal sensitivities are oriented in the same direction) such that, for example, the positive output for shear sensitivity of each pair of sensors is along the same axis and in the same direction. The pairs of sensors 106 on opposing sides of the test mass 102 are oriented such that the sensors 106 on opposing sides along the same axis and in the same direction, i.e., they are arranged as mirror images of each other.

Sensor Response

Figure 9:
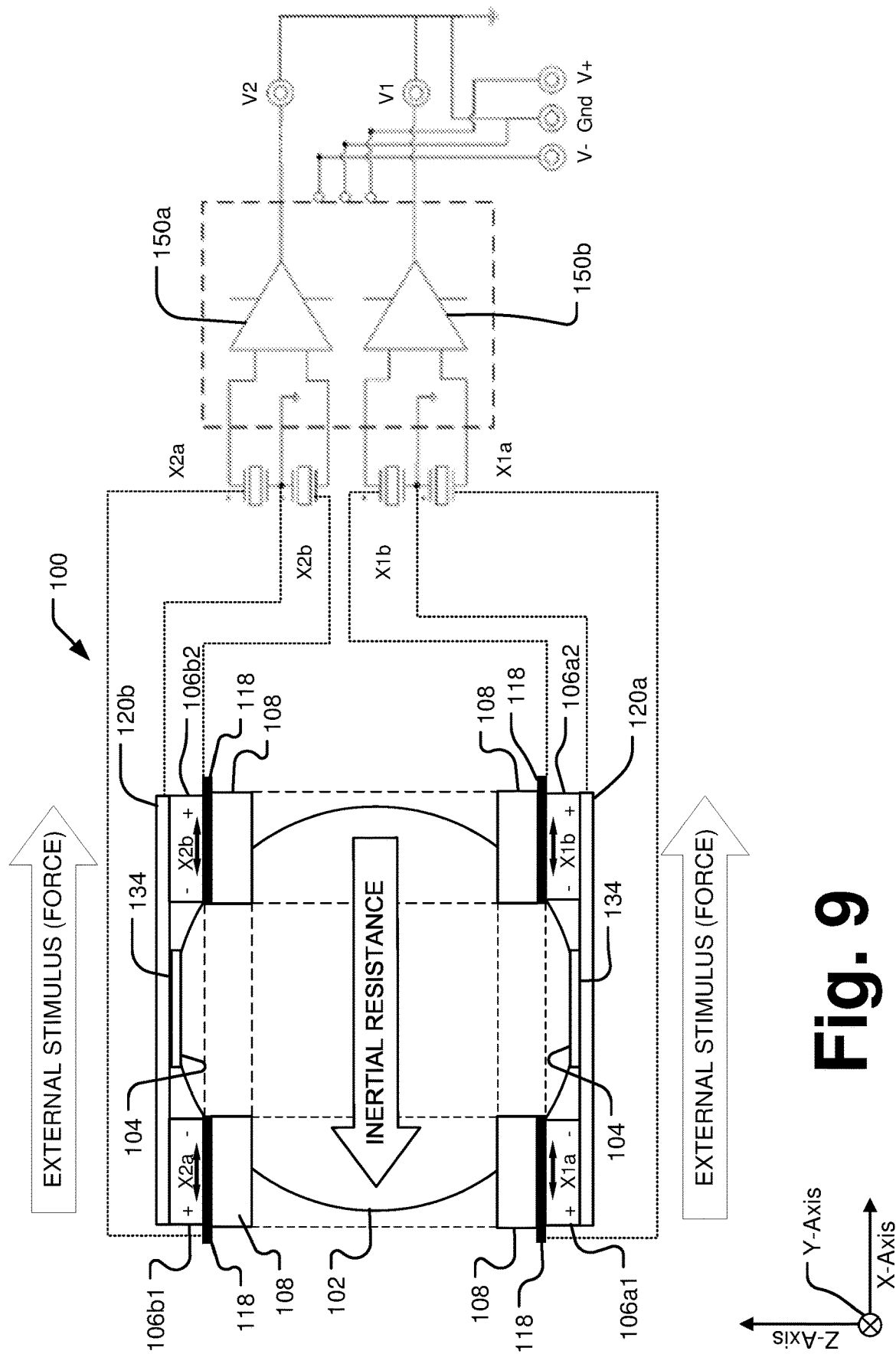
FIG. 9 is a schematic diagram illustrating a translational external stimulus force applied to a frame of a multi-axis, single mass accelerometer in the positive direction of the X-axis.

FIG. 9 is a schematic diagram illustrating an external stimulus applied to the accelerometer 100. As shown in FIG. 9, a translational external stimulus applies force to the housing or frame 108 in the positive direction of the X-axis. The individual sensors 106, e.g., piezoelectric crystal transducers, are mounted to the frame 108 with one-sided insulators 118 sandwiched in between. As shown in the schematic view of FIG. 9, the "+" and "−" symbols overlaid on each of the transducers 106a1-106b2 are indicative of the shear stress sensitivity alignment of the sensors 106 and are oriented in opposing directions for each sensor pair. They are not necessarily indicative of the location or polarity of the electrodes connected to the transducers 106. The surface or side of the insulators 118 opposite from the frame 108 and adjacent to the sensors 106 may be conductive to act as an electrode for connection of wires from processing circuitry to the sensors 106. The suspension blades 120a, 120b mechanically connect the test mass 102 to the sensors 106. The suspension blades 120a, 120b preferably are conductive and provide a ground connection to the negative electrode of the sensors 106. The suspension blades 120a, 120b are mechanically connected to the coupling surfaces 104 of the test mass 102 preferably via a rigid insulator 134 to electrically isolate the test mass 102 from the sensors 106 to reduce the potential noise source of the test mass 102.

For a translational accelerometer sensor 100, when a suitable external impulse travels along a designated positive sensing axis, the sensor 106 generates a positive (or negative/inverted) signal responsive to the resulting shear stress on the sensor 106. The inertial resistance of the test mass 102 resists the external acceleration or stimulus and a shear stress develops across each pair of sensors 106a1-106b2 positioned to respond to the external acceleration. The body of the test mass 102 and the frame 108 push and pull on the opposing faces of the sensors 106 via the suspension blades 120, generating shear stress. The sensors 106a1 and 106a2 are oriented opposite to each other in polarity of output such that when a force is applied to the accelerometer 100 in the indicated direction, the output of the first sensor 106a1 will be a positive value and the output of the second sensor 106a2 will be negative as the force is opposite the crystal orientation. Similarly, the output of the third sensor 106b1 will be a positive value and the output of the fourth sensor 106b2 will be negative. Alternatively, the sign convention may be reversed, without loss of generality. If the sensor response (piezoelectric crystal voltage output) were to merely be summed for each pair of sensors 106a1, 106a2 and 106b1, 106b2, the positive and negative values of each pair would cancel each other out and provide a voltage response of substantially zero.

However, as shown, the voltage output of the pairs of sensors 106a1, 106a2 and 106b1, 106b2 is transmitted to a pair of difference amplifiers 150a, 150b. The difference amplifiers 150a, 150b subtract the second voltage signal input from the first voltage signal input before amplification. Therefore, in view of the opposite orientation of crystal sensitivity for each pair of sensors 106a1, 106a2 and 106b1, 106b2, the result is additive. Thus, the input signal received from the sensors 106 is potentially twice the magnitude of the output from each individual crystal. As indicated in FIG. 9, each pair of sensors 106a1, 106a2 and 106b1, 106b2 generates a signal which is amplified by the difference amplifiers 150a, 150b and output as V1 and V2. These voltage outputs may be summed, taking into account DC offset removal, sensitivity corrections, and orthogonality corrections, to generate a translational acceleration response value for a particular axis.

As described above, the mechanical design of the suspension blades 120 minimizes response of the sensors 106 to off-axis forces, which further helps attenuate off-axis noise. In addition, noise attributable to off-axis force components, which manifest as common-mode signal voltage, is largely rejected and filtered from the final signal, due to the common-mode rejection filtering inherent in differential amplifiers. As an example, consider the isolated suspension blade 120 in FIG. 8A subject to pure translational acceleration in direction 174. The acceleration of the frame 108 to which the suspension blade is mounted is in a direction 174 normal to the length of the suspension blade 120, which extends in direction 170. Even though the openings 122 in the suspension blade 120 limit the stiffness of the suspension blade 120 perpendicular to direction 170 (in order to maximize crystal response to motion in direction 170), some tension occurs against the crystals attached to the suspension blade 120 as the test mass 102 moves inward or outward in response to movement of the frame 108 in direction 174. The charge/voltage response of the two crystal sensors 106 of the suspension blade 120 to this motion is of the same polarity, though, and is effectively rejected by the common-mode rejection of the difference mode amplifiers 150a, 150b. Similarly, for a rotation of the frame 108 around the test mass 102 about an axis parallel to direction 174, the force induced on the suspension blade 120 causes tension against the crystals 106, again causing a common-mode signal rejected by the difference mode amplifier 150a, 150b. The overall effect of the dual crystal/difference mode amplifier is to further reject unwanted signal (contamination) in the longitudinal axis direction 170 from translational motion in the perpendicular axes, directions 172 and 174, and from rotational motion about directions 170 and 174, promoting high-fidelity transduction.

As noted above, in an alternative embodiment, when the pairs of piezoelectric crystal sensors 106 are aligned in the same orientation, the output of the pairs of sensors may be transmitted in parallel to a corresponding circuit for filtering and amplification. A person of skill in the art will understand this alternate wiring arrangement of the sensors and it is thus not described in further detail here. Notably, in this arrangement, the input charge received from each pair of sensors 106 aligned on one side of the test mass 102 is potentially twice the magnitude of the output from each individual crystal. In yet a further embodiment, each sensor 106 about the test mass 102 may be wired individually and directly to a corresponding amplifier within a sensing circuit. In such a configuration, the sensors 106 may be electrically insulated from the suspension blades 120 in addition to the test mass 102 by placing additional insulating pads between the sensors 106 and the suspension blades 120. Again, a person of skill in the art will understand this alternate configuration and wiring arrangement of the sensors and it is thus not described in further detail here. Each of these wiring configurations may provide unique advantages that may be preferable depending upon the output data desired.

Rotational Response

Figure 1:
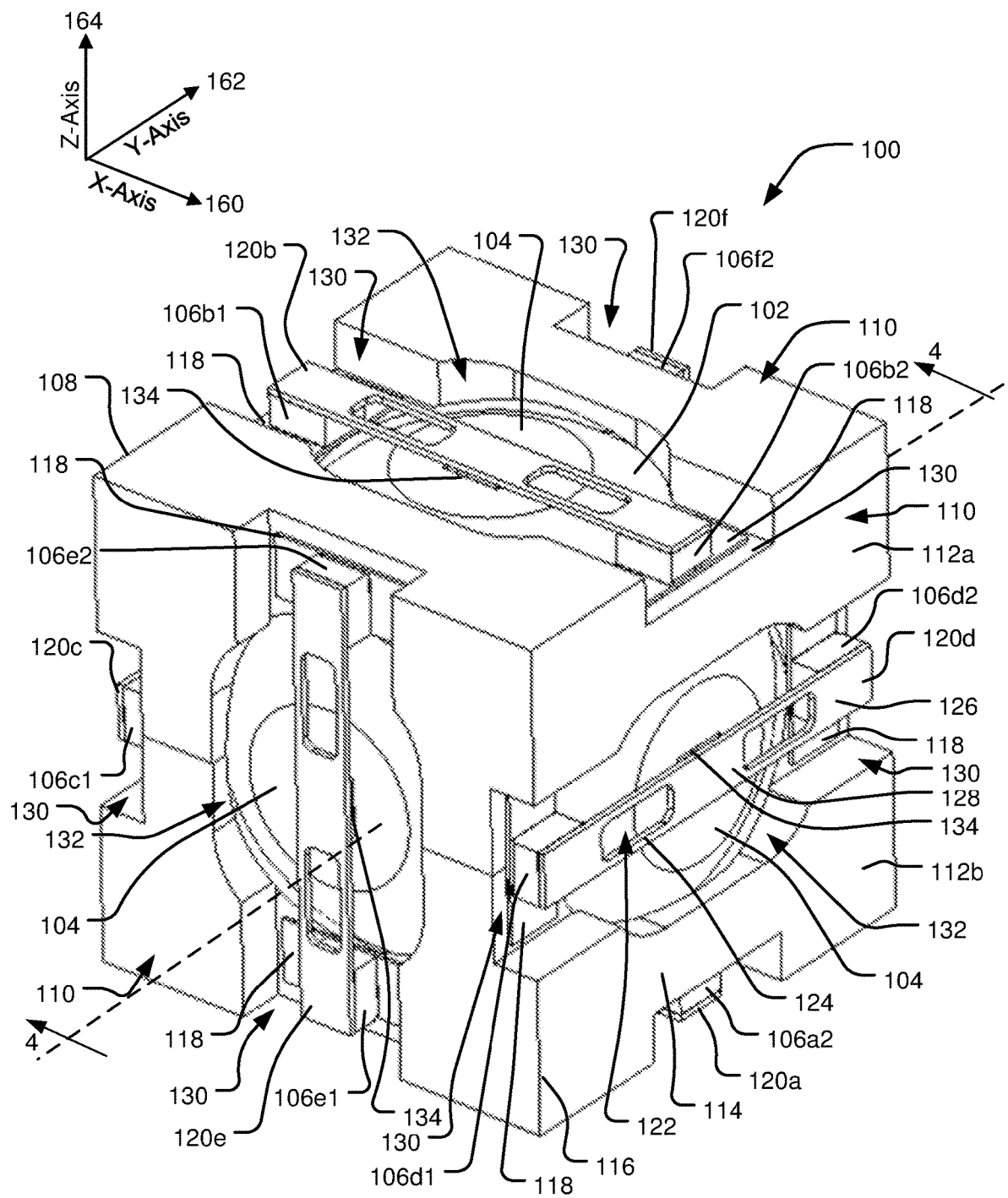
FIG. 1 is an isometric view of a multi-axis, single mass accelerometer according to an exemplary embodiment disclosed herein.
Figure 2:
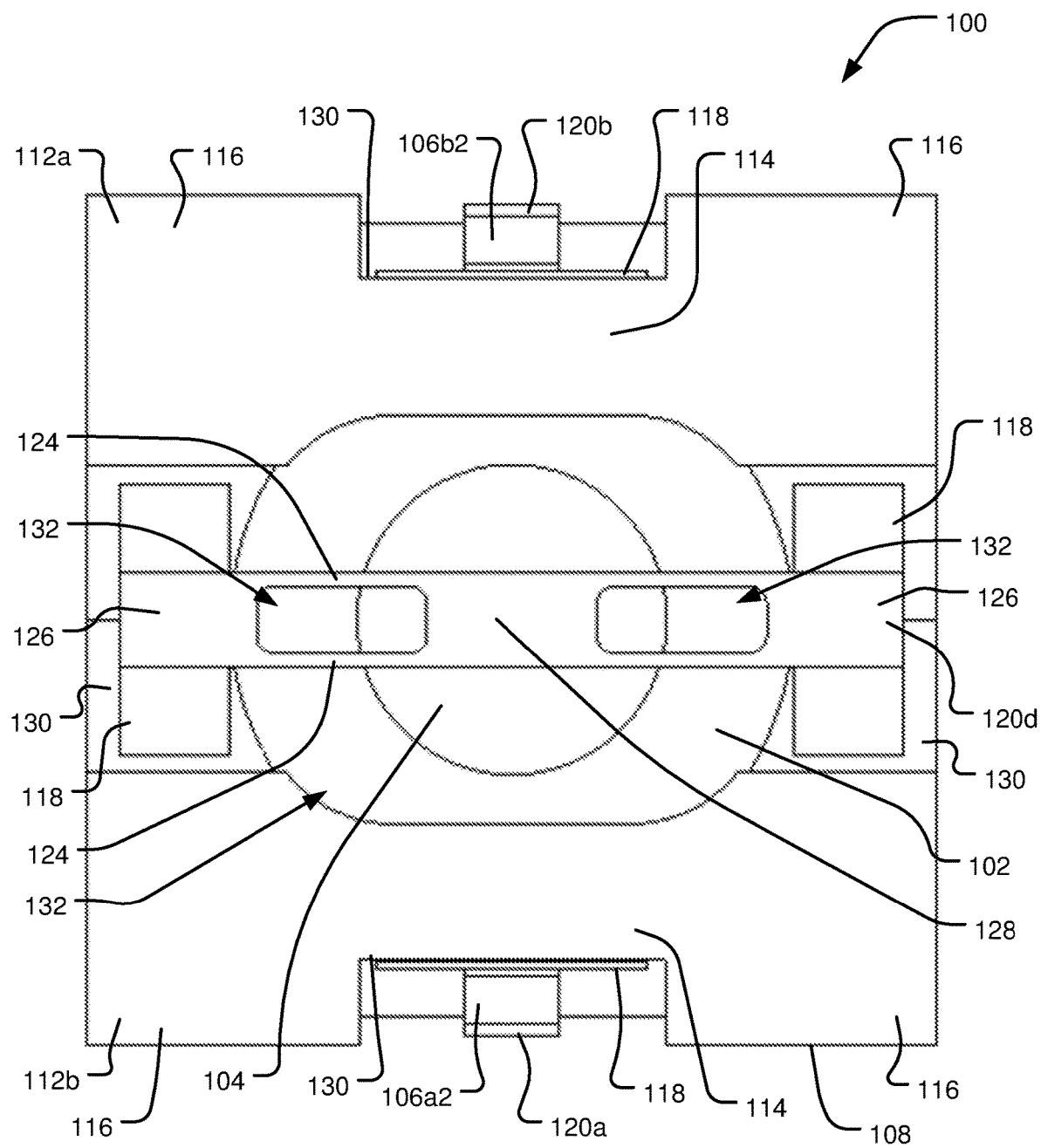
FIG. 2 is a front elevation view of the multi-axis, single mass accelerometer of FIG. 1.
Figure 3:
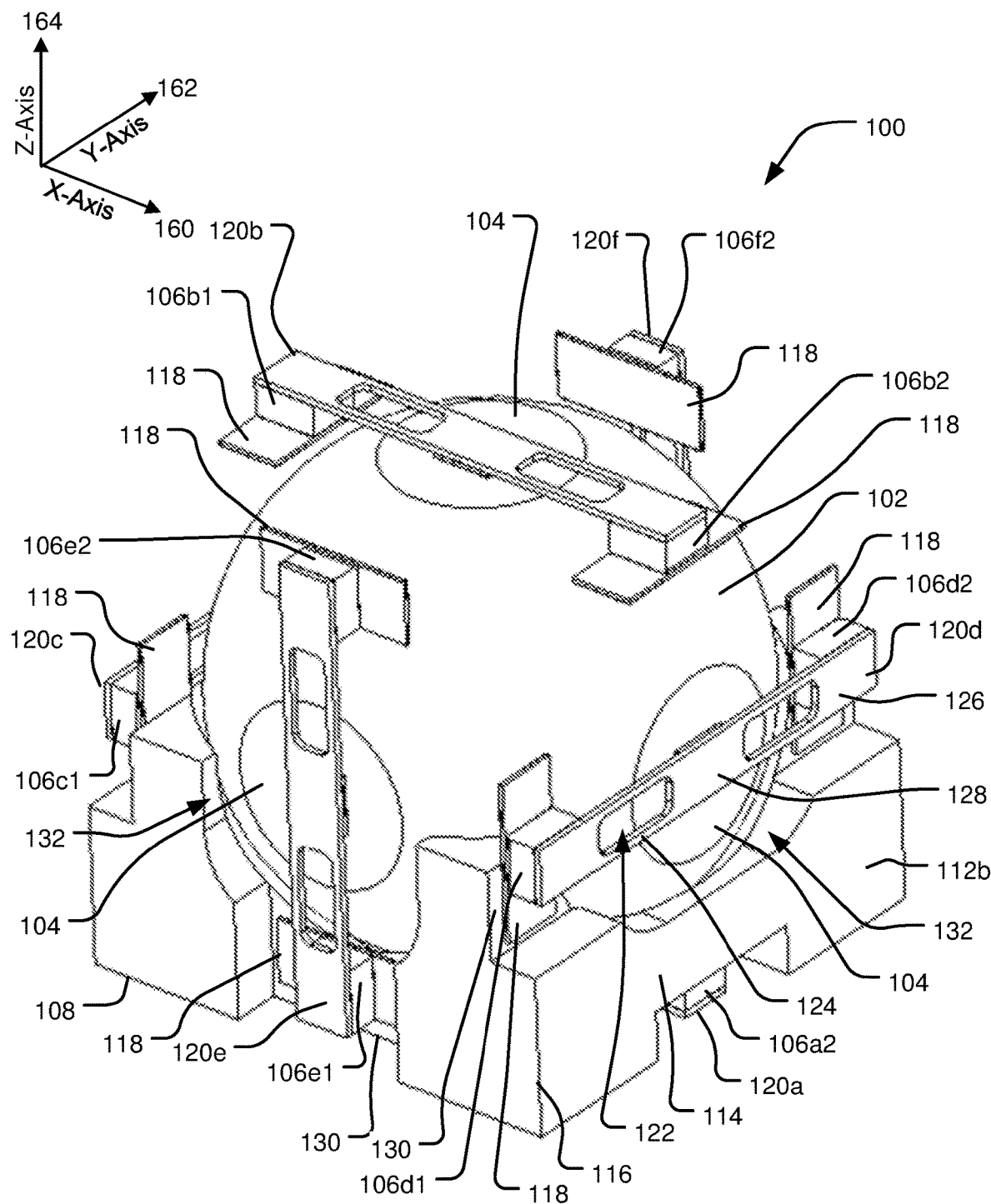
FIG. 3 is an isometric view of the multi-axis, single mass accelerometer of FIG. 1 with a top half of the frame removed.

The three sensor axes X, Y, Z may be orthogonally arranged, e.g., with the positive polarity orientation of each axis satisfying the right-hand rule (see FIG. 1). For a rotational acceleration sensor, a coupled set of pairs of piezoelectric crystal transducers 106 as disclosed herein will generate voltage of a positive polarity for acceleration in a clockwise direction around their common axis, viewed through the plane of the motion and along the positive axis normal to the plane. Described another way, looking down from the positive end of the axis normal to the plane of rotation, acceleration of a coupled set of pairs of sensors in a counter-clockwise direction around the axis will generate voltage of a positive polarity. Alternatively, the sign convention may be reversed, without loss of generality. From the same sensors that measure translation acceleration along the X-axis, rotational acceleration may be calculated for rotational movement about the Y-axis. From the same sensors that measure translation acceleration along the Y-axis, rotational acceleration may be calculated for rotational movement about the Z-axis. And from the same sensors that measure translation acceleration along the Z-axis, rotational acceleration may be calculated for rotational movement about the X-axis.

Figure 10:
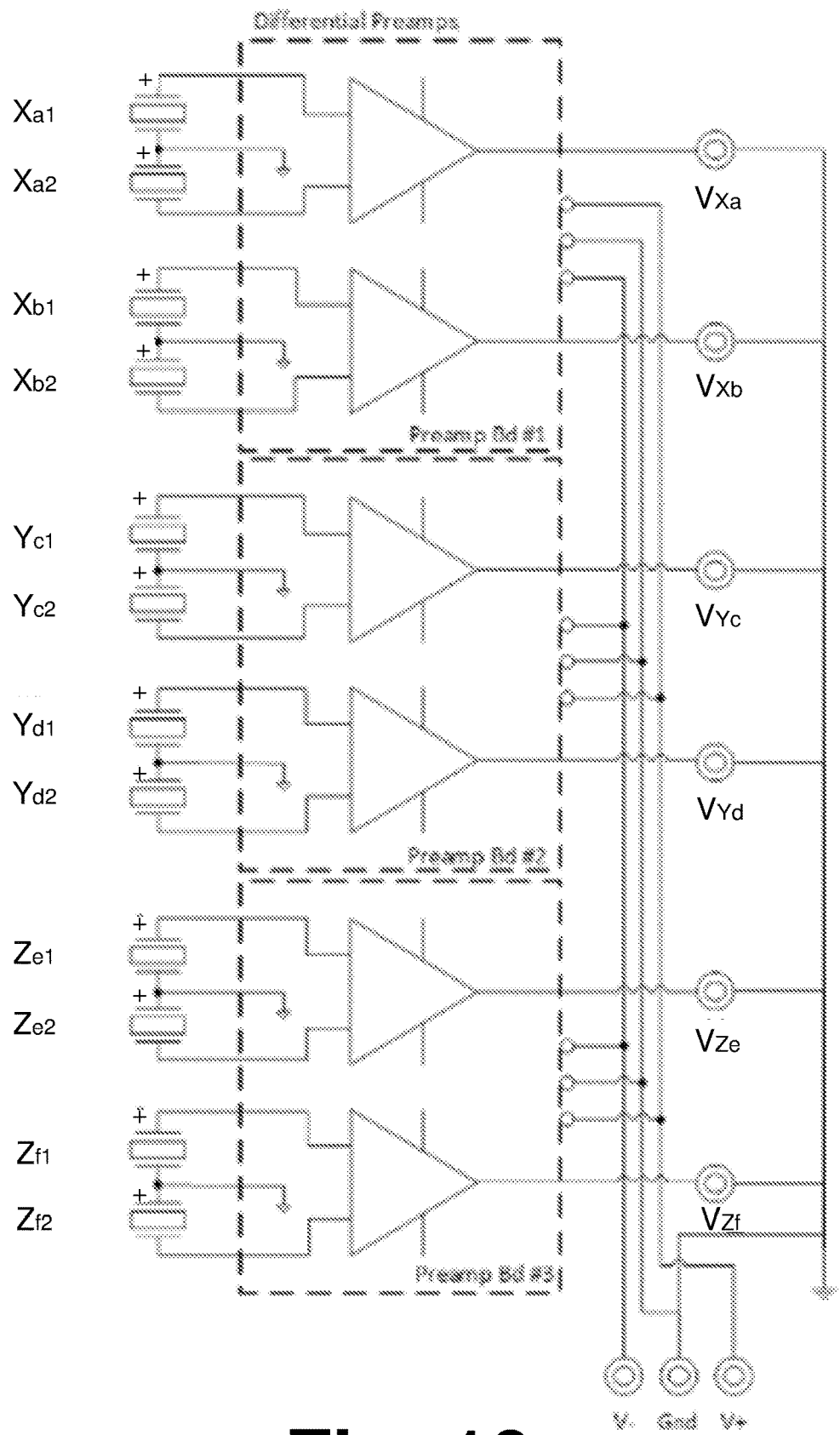
FIG. 10 is a representative schematic wiring diagram for a set of transducers in a multi-axis, single mass accelerometer.

FIG. 10 is a representative wiring diagram for a set of piezoelectric transducers or sensors in a multi-axis, single mass accelerometer as described herein. FIG. 10 is a simplified schematic denoting the wiring of the preamp boards and twelve channels Xa1-Zf2 corresponding to the sensors 106 in embodiments of the multi-axis, single mass accelerometer disclosed herein. In some embodiments, an integrated preamp/digitizer may be placed behind the buffer preamp. In additional embodiments, a post-digitization processer for gain adjust and offset removal may be used before forming the final translational and rotational motion output signals, e.g., via digital summation and differencing.

In some configurations, the multi-axis, single mass accelerometer may have twelve sensor outputs, pairs of which from the same face of the frame are combined by the difference amplifier to result in six axial voltage outputs: $V_{Xa}$, $V_{Xb}$, $V_{Yc}$, $V_{Yd}$, $V_{Ze}$, and $V_{Zf}$. These voltage outputs can then be used to generate three orthogonal translational acceleration responses and three rotational acceleration responses. The translational and rotational acceleration responses for each axis (which may be designated $X_t$, $X_r$; $Y_t$, $Y_r$; and $Z_t$, $Z_r$, respectively) are formed from the sum and difference of the six voltage outputs from the difference amplifiers. A sign convention determines whether the translational and rotational outputs are derived by summing or differencing the axial voltage outputs. For particular design purposes, the translational response signal may be generated by summation of the opposing voltage outputs for an axis. As a consequence, the difference of the opposing voltage outputs along an axis may be used to generate the rotational acceleration response. The sign convention is however arbitrary, and may be reversed without loss of generality.

For example, in an alternative embodiment as described above, when the pairs of piezoelectric crystal sensors 106 are aligned in the same orientation, the voltage output of pairs of sensors on opposing sides of the test mass (oriented parallel to the same sensing axis) wired in parallel may be differenced in order to detect rotational motion about a second axis orthogonal to the sensing axis. A person of skill in the art will understand this alternate wiring arrangement of and computational output for the sensors and thus such is not described in further detail here.

Signal Enhancement

Figure 11:
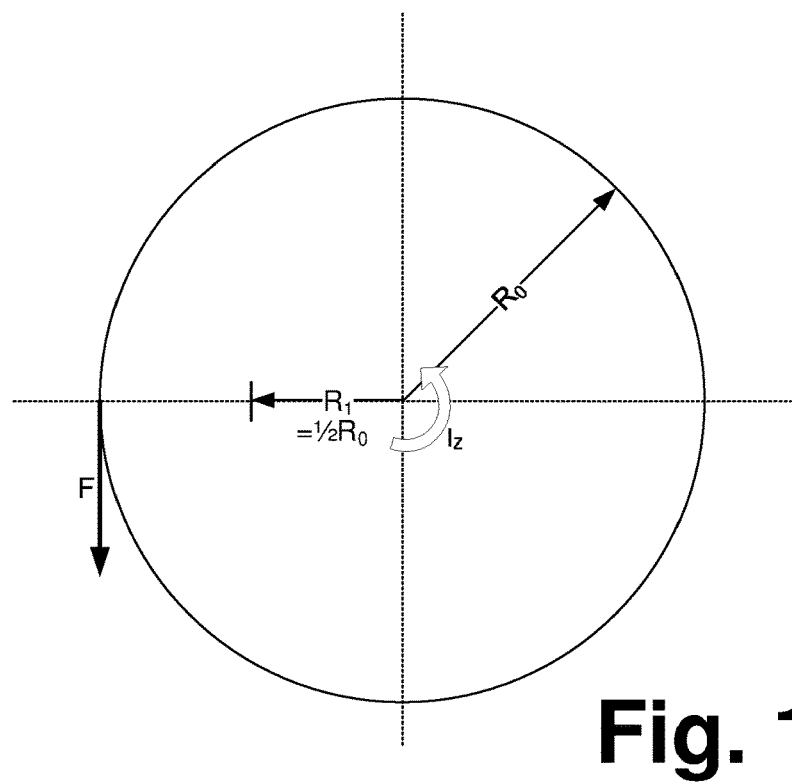
FIG. 11 is a schematic representation of an exemplary method for configuring a multi-axis, single mass accelerometer to significantly increase the sensitivity of the crystal sensor response.

FIG. 11 is a schematic representation of an exemplary method for configuring a multi-axis, single mass accelerometer as disclosed herein to significantly increase the sensitivity of the crystal sensor response. A simple two-dimensional disk of radius $R_0$ is presented in plan view; consider a rotational sensor, similar to a single axis sensor in the three-dimensional sensor described herein, in which a piezoelectric crystal connects such a disk to an external frame. A force F (delivered by the frame) and acting on the circumference of the disk at $R_0$ creates a torque ($\tau = FR_0$). In the context of a rotating body, torque may be expressed in terms of angular acceleration ($\alpha$), i.e., $\tau = I\alpha$, where I is the moment of inertia of the rotating body. For a thin disk of radius $R_0$ rotating about an axis Z:

$$I_z = \tfrac{1}{2}mR_0^2.$$

Presuming that the crystal area is small relative to the disk as a whole, the force that generates the torque can be represented as the product of the average shear stress ($\sigma$) on the crystal, which largely determines the voltage it generates, and its area (A), i.e., $F = \sigma A$. Upon substitution, the equation for torque then becomes:

$$\sigma A R = \tfrac{1}{2}mR_0^2 \alpha.$$

Presuming the mass of the test mass 102 is small relative to that of the frame 108 to which it is attached and to that of any equipment to which the frame 108 itself is attached, then a given external rotational acceleration stimulus will generate a given angular acceleration ($\alpha$) of the test mass 102 and of the frame 108, no matter the radius at which that stimulus acts. Accordingly, the right hand side of the above equation may be viewed as a relative constant; and the stress on a piezoelectric sensor may be viewed to scale as:

$$1/R_1,$$

where $R_1$ is the radius of the crystal sensor from the center of the test mass, at which it serves as a torque arm connecting the frame 108 to the inertial mass 102.

For example, as shown in FIG. 11, if the radius $R_1$ of the torque arm can be reduced to half of the radius $R_0$ of the test mass, then the shear stress on the crystal sensors may be significantly increased and thereby improve the sensitivity of the sensors, relative to a sensor in which the crystal connects at the circumference of the test mass. In other words, when $R_1 = 0.5R_0$:

$$\frac{\sigma_1}{\sigma_0} \sim \frac{R_0}{R_1} = \frac{R_0}{0.5R_0} = 2.$$

In this example, the sensitivity could potentially be doubled.

Returning to FIGS. 1-5, it should now be apparent that by creating the coupling surfaces 104 on the test mass 102, the length of the torque arm at the attachment point of the suspension blades 120, which further attach to sensors 106, is shortened by a distance $D_3$, as shown in FIG. 4. Thus, by reducing the distance $D_1$ between the point at which the struts couple with the test mass 104 and the center of the mass (in this example, the interface between suspension blades 120 and the coupling surfaces 104), the sensitivity of the sensor 106 responses to the forces acting on the accelerometer 100 is enhanced by several percent, relative to a design in which the sensors are attached at the full radius of the test mass 102.

Seismic Sensing Applications

When a seismic sensing node is coupled to the sea floor (or other sedimentary bottom of a body of water), translational and rotational measurements will reflect the corresponding movement of the sediments (which are considered to be a solid) at that location. Unlike in a fluid where only p-waves (also known as longitudinal or compressional waves) propagate, in a solid one encounters propagation of both p-waves and s-waves (also known as shear or transverse waves). Further, because the sea floor is the notional interface separating the solid sedimentary floor from the fluid body of water, sometimes referred to as a "free boundary," the sea floor often gives rise to other types of waves, so-called interface waves, such as the Scholte wave. In existing industry practice to discern direction of propagation for a seismic wave one has to use a spatially-distributed array of seismometers that measure translational motion so that the spatial derivative of the measured vertical acceleration in the X direction ($dA_z/dx$) and the spatial derivative of the measured vertical acceleration in the Y direction ($dA_z/dy$) can be calculated as a finite difference approximation.

Because fluids do not support s-waves, a unique aspect of free boundaries is that the shear stress in the (X, Z) and (Y, Z) vertical planes vanishes at the boundary (i.e., the solid/fluid interface). This, in turn, leads to the following result: rotation measured about the X-axis ($R_x$) equals $dA_z/dy$, the spatial derivative of the measured vertical acceleration in the Y direction and, similarly, rotation measured about the Y axis ($R_y$) equals $dA_z/dx$, the spatial derivative of the measured vertical acceleration in the x direction. Note that the spatial derivative of a propagating wave characterizes its direction of propagation. Unlike prior sensors, the multi-axis, single mass accelerometer disclosed herein is a 6-component sensor and can record all of these waves in combination with its translational and rotational components. The multi-axis, single mass accelerometer is thus able to measure propagation direction at the free boundary interface for a certain component of the seismic wavefield ($V_z$) and acts as a "point seismic array." (See, *REF: Investigating the Point Seismic Array concept with seismic rotation measure-*

*ments*, D. Aldridge and R. Abbott, *Sandia National Lab., Report SAND*2009-0798). The full set of 6-component measurements may thus be sufficient to algorithmically determine the type (compressional or shear), speed, and direction of any incident plane wave, thus dispensing with the need to deploy spatially-extended receiver arrays.

Thus, as it relates to the vertical acceleration, by virtue of recording both the value of the function $V_z$ and the values of its spatial derivatives via $R_x$ and $R_y$ (slopes of the function) at the same point, one can exactly interpolate a regularly sampled grid by a factor of two, subject to the aliasing frequency limit of the subsampled grid. As an example, one can use a 500 m×500 m rather than a 250 m×250 m sampling grid and interpolate exactly from the former to the latter at a substantially reduced cost, which at the theoretical limit equals 75%. This in turn has a profound effect on reducing the cost of acquiring ocean bottom seismic data.

CONCLUSION

A multi-axis, single mass accelerometer may thus be implemented as a twelve-component seismic sensor configured for measuring three degrees of freedom in translational motion along three independent directions and three degrees of freedom in rotation about three independent axes. In some of these embodiments, the accelerometer is provided with three sets of piezoelectric sensors arranged along independent or orthogonal axes and coupled in opposing pairs to a frame and to a test mass suspended therein.

The resonance of such a multi-axis, single mass accelerometer may be one or more orders of magnitude higher than other sensors (e.g., a typical particle acceleration sensor), which enables a reasonable implementation of a high-cut mechanical shock system while maintaining flat response within a selected frequency band of interest. The accelerometer may incorporate directional sensing by configuring the crystal sensors and beams in unique orientations, and/or by attaching the crystal sensors to the test mass with supports that are "stiff" along the principal axis of sensing and "soft" along the cross axes. One objective that may be met by such a configuration is to reduce or minimize distortion in the frame, while enhancing or maximizing shear stress in the crystal along the primary sensing direction.

Each of the transducers or sensors may have a crystal orientation defining a shear sensitivity, with the shear sensitivity of the transducers in each pair being oriented generally parallel to one another, but in opposing directions of sensitivity, and substantially perpendicular to the respective principal axis. In other words, each crystal may be sensitive to shear in the plane defined by the sense direction 170 and the normal direction 174, with one crystal in a pair generating positive voltage for a positive rotational distortion about the normal direction 172 and the other generating positive voltage for a negative rotational distortion about the normal direction 172. Furthermore, the shear sensitivities of the three sets of opposing pairs of transducers may be oriented in mutually perpendicular directions. The mutually perpendicular directions can correspond to the principal axes.

The frame or housing may comprise a plurality of sides arranged in pairs on the opposing sides of the central mass, as defined along the three principal axes, with each pair of transducers coupled to a respective one of the sides of the frame. A suspension blade may be disposed along a central portion of each side of the frame. Each lateral end of each suspension blade is configured to couple to a respective sensor, and a middle portion of each suspension blade is configured to couple to the test mass. Each suspension may have a non-uniform cross section defining a relatively higher stiffness along a primary sensing direction 170 of the respective transducer (e.g., as defined by the crystal orientation, with shear sensitivity in the plane defined by the sense direction 170 and the normal direction 174), and a relatively lower stiffness perpendicular to the primary sensing direction (e.g. in the normal directions 172 and 174).

In any of these examples and embodiments, the suspension blades may be conductive. Each of the sensors may be electrically coupled to the conductive suspension blades, in order to define a common terminal potential. For example, each of the transducers may be oriented with a negative electrode side disposed toward the suspension blades, and all of the suspension blades may be electrically connected to define a common ground.

Electronics may be configured to combine signals of the sensors in each pair using differential amplification, in order to generate an output characterizing acceleration of the frame in a direction parallel to the corresponding principal axes. Similarly, the electronics may be configured to combine signals of the transducers in each set of pairs to generate an output characterizing rotational acceleration of the frame about the respective principal axes. Depending on electrode and response convention for the selected transducer crystal orientation, the amplified signals from sensor pairs in each set may be combined by summing to generate the (translational) acceleration output, and combined by subtraction to generate the rotational acceleration output, utilizing suitable preamplifier electronics, gain factors, and other parameters.

EXAMPLES

A multi-axis, single mass acceleration can be provided, sensor comprising a three-dimensional frame, a test mass disposed within and spaced apart from the frame, a plurality of transducers mechanically coupled to the frame at a plurality of respective locations on the frame, and a plurality of struts configured to couple to the central mass at a plurality of respective positions and to couple with respective sets of the transducers at the plurality of respective locations, thereby suspending the test mass within the frame; e.g., where the sensor is responsive to translational motion in multiple independent directions and to rotational motion about multiple independent axes.

Each set of transducers may comprise a pair of the transducers positioned on opposing sides of a respective face of the frame; e.g., with lateral ends of respective struts connect to each pair of transducers on the opposing sides of each respective face of the frame. Each strut may be stiffer along a longitudinal sensing axis than along axes perpendicular to the longitudinal sensing axis. The plurality of struts can be arranged in pairs, with the struts in each pair arranged parallel to each other; e.g., with each strut of each pair of struts positioned on an opposite side of the test mass from its pair, and/or with each strut positioned normal to one of a plurality of principal axes of the sensor.

In any of these examples and embodiments, the plurality of principal axes of the sensor may be orthogonal to each other; e.g., where a plurality of planar coupling surfaces are formed on an outer surface of the test mass and each of the planar coupling surfaces is positioned normal to one of the principal axes, and/or where a center portion of each of the struts is attached to a respective planar coupling surface of the test mass. Each planar coupling surface may be parallel to a plane defined by two orthogonal axes centered within the test mass and at a first distance away from the plane; e.g., where an attachment surface of the frame to which a respective transducer is coupled to the frame is a second distance from the plane, and/or where the first distance is greater than the second distance. A rigid insulator can be positioned between each of the struts and the respective planar coupling surface of the test mass.

In any of these examples and embodiments, a rigid insulator can be positioned between each of the transducers and the frame. The test mass may be a hollow sphere with walls of uniform thickness, and/or the test mass may be formed of brass. The transducers may be oriented with respect to respective struts, in order to respond primarily or substantially to acceleration parallel to a longitudinal sensing axis of each respective strut. The transducers may be responsive to shear stress and oriented with respect to respective struts to respond primarily to shear stress in a plane defined by a longitudinal sensing axis of each respective strut and a corresponding axis extending outward from a center of mass of the test mass normal to the longitudinal sensing axis of each respective strut.

In any of these examples and embodiments, for each set of transducers and a corresponding one of the struts coupled with the respective set of transducers, each transducer may be coupled to a respective attachment surface on the frame, each attachment surface may be parallel to and spaced apart from a plane defined by two orthogonal axes centered in the test mass, and/or a first distance measured between each attachment surface and the plane may be less than a second distance measured between a point at which the corresponding one of the struts couples with the test mass and the plane. For example, the second distance may be less than a radius of the test mass.

In any of these examples and embodiments, a distance measured between a point at which the corresponding one of the struts couples with the test mass and a center of the test mass can be less than a radius of the test mass.

A multi-axis, single mass acceleration sensor is provided, comprising a three-dimensional frame, a hollow, substantially spherical test mass disposed within and spaced apart from the frame, six pairs of shear crystals mechanically coupled to the frame, and six suspension blades each coupled at a center portion to the central mass normal to opposite ends of each of the three orthogonal principal axes, respectively; e.g., coupled with a respective pair of shear crystals at each lateral end of the suspension blades, thereby suspending the test mass within the frame. The sensor can be oriented with respect to three orthogonal principal axes that each pass through a center of mass of the test mass, and the sensor can be responsive to translational motion parallel to the three orthogonal principal axes and to rotational motion about the three orthogonal principal axes.

In any of these examples and embodiments, a mass distribution of the test mass may be symmetric. The six suspension blades can be arranged in three pairs; e.g., with the suspension blades in each pair arranged parallel to each other on opposing sides of the test mass. The suspension blades may be conductive; e.g., with an electrical connection formed between each pair of shear crystals and the corresponding suspension blade.

In any of these examples and embodiments, a rigid insulator can be positioned between each of center portions of the suspension blades and the test mass. The suspension blades can be made of beryllium copper, and/or formed as flat plates with two apertures formed between a center section and respective lateral end sections. Each suspension blade may be stiffer along a longitudinal sensing axis than along axes perpendicular thereto; e.g., where the longitudinal sensing axis of each suspension blade is parallel to one of the orthogonal principal axes, and perpendicular to a second one of the orthogonal principal axes.

In any of these examples and embodiments, a plurality of planar coupling surfaces can be formed on an outer surface of the test mass; e.g., where each of the planar coupling surfaces is positioned normal to one of the three principal axes, and/or with the center portion of each of the suspension blades attached to a respective planar coupling surface of the test mass.

A rigid insulator can be positioned between each of the suspension blades and the respective planar coupling surface of the test mass. A distance measured between a respective planar coupling surface at which a corresponding one of the suspension blades couples with the test mass and the center of mass of the test mass, may be less than a radius of the test mass. Each planar coupling surface may be parallel to a plane defined by two of the orthogonal principal axes and at a first distance away from the plane; e.g., where the frame is defined by twelve beams and each beam of the frame defines a pocket midway along a length of the beam, and/or where a base of each pocket defines an attachment surface to which a respective shear crystal is coupled. Each attachment surface may be parallel to the plane; e.g., at a second distance from the plane, and connected to the test mass at a corresponding planar coupling surface by a respective suspension blade through the respective shear crystal. The first distance may be greater than the second distance.

In any of these examples and embodiments, a distance measured between a respective coupling point at which a corresponding one of the suspension blades couples with the test mass and the center of mass of the test mass may be less than a radius of the test mass. The frame can be defined by twelve beams; e.g., where each beam of the frame defines a pocket midway along a length of the beam, and/or where a base of each pocket defines an attachment surface to which a respective shear crystal is coupled. A rigid insulator can be positioned between each of the transducers and each respective attachment surface in the pocket of the frame.

In any of these examples and embodiments, walls of the hollow, spherical test mass may be of uniform thickness. The test mass may be formed of brass. The shear crystals can be oriented with respect to respective suspension blades to respond primarily or substantially to acceleration parallel to a longitudinal sensing axis of each respective suspension blade. The shear crystals may be responsive to shear stress and are oriented with respect to respective suspension blades to respond primarily to shear stress in a plane defined by a longitudinal sensing axis of each respective sensing blade parallel to a first one of the principal axes and by a second one of the principal axes extending outward from the center of mass of the test mass normal to the longitudinal sensing axis of each respective suspension blade. Alternatively, each pair of shear crystals can be wired in series within a first amplifying circuit, and/or each pair of shear crystals can be wired in parallel within a second amplifying circuit.

The specification, examples and data herein provide a complete description of the structure and use of exemplary embodiments of the invention as defined in the claims. Although various embodiments of the claimed invention are described with a certain degree of particularity, or with reference to one or more individual embodiments, other embodiments are contemplated. Those skilled in the art could make numerous alterations to the disclosed embodiments and equivalents may be substituted to adapt the disclosure to different problems and applications without falling outside the scope of the claims. It is intended that all matter contained in the description and shown in the accompanying drawings shall be interpreted as illustrative only of particular embodiments and not limiting. Thus, the invention is not limited to the examples described herein, but rather encompasses all embodiments falling within the scope of the appended claims.

What is claimed is:

1. A multi-axis, single mass acceleration sensor comprising:
   a three-dimensional frame;
   a test mass disposed within and spaced apart from the frame;
   a plurality of transducers mechanically coupled to the frame at a plurality of respective locations on the frame; and
   a plurality of struts coupled to the test mass at a plurality of respective positions and coupled to respective sets of the transducers at the plurality of respective locations, thereby suspending the test mass within the frame, wherein the struts connect the transducers to the test mass;
   wherein the sensor is responsive to translational motion in multiple independent directions and to rotational motion about multiple independent axes.

2. The sensor of claim 1, wherein:
   each set of transducers comprises a pair of the transducers positioned on opposing sides of a respective face of the frame; and
   lateral ends of respective struts connect to each pair of transducers on the opposing sides of each respective face of the frame.

3. The sensor of claim 1, wherein each strut is stiffer along a longitudinal sensing axis than along axes perpendicular to the longitudinal sensing axis.

4. The sensor of claim 1, wherein:
   the plurality of struts is arranged in pairs with the struts in each pair arranged parallel to each other;
   each strut of each pair of struts is positioned on an opposite side of the test mass from the other strut in the pair; and
      each strut is positioned normal to one of a plurality of principal axes of the sensor.

5. The sensor of claim 4, wherein:
   the plurality of principal axes of the sensor are orthogonal to each other;
   a plurality of planar coupling surfaces are formed on an outer surface of the test mass and each of the planar coupling surfaces is positioned normal to one of the principal axes; and
   a center portion of each of the struts is attached to a respective planar coupling surface of the test mass.

6. The sensor of claim 5, wherein:
   each planar coupling surface is parallel to a plane defined by two orthogonal axes centered within the test mass and is a first distance away from the plane;
   an attachment surface of the frame to which a respective transducer is coupled to the frame is a second distance from the plane; and
   the first distance is greater than the second distance.

7. The sensor of claim 5, wherein a rigid insulator is positioned between each of the struts and the respective planar coupling surface of the test mass.

8. The sensor of claim 1, wherein a rigid insulator is positioned between each of the transducers and the frame.

9. The sensor of claim 1, wherein the test mass is a hollow sphere with walls of uniform thickness.

10. The sensor of claim 1, wherein the test mass is formed of brass.

11. The sensor of claim 1, wherein the transducers are oriented with respect to respective struts to respond primarily to acceleration parallel to a longitudinal sensing axis of each respective strut.

12. The sensor of claim 1, wherein the transducers are responsive to shear stress and are oriented with respect to respective struts to respond primarily to shear stress in a plane defined by a longitudinal sensing axis of each respective strut and a corresponding axis extending outward from a center of mass of the test mass normal to the longitudinal sensing axis of each respective strut.

13. The sensor of claim 1, wherein for each set of transducers and a corresponding one of the struts coupled with the respective set of transducers:
   each transducer is coupled to a respective attachment surface on the frame;
   each attachment surface is parallel to and spaced apart from a plane defined by two orthogonal axes centered in the test mass; and
   a first distance measured between each attachment surface and the plane is less than a second distance measured between a point at which the corresponding one of the struts couples with the test mass and the plane.

14. The sensor of claim 13, wherein the second distance is less than a radius of the test mass.

15. The sensor of claim 1, wherein a distance measured between a point at which the corresponding one of the struts couples with the test mass and a center of the test mass is less than a radius of the test mass.

16. A multi-axis, single mass acceleration sensor comprising:
   a three-dimensional frame;
   a hollow, substantially spherical test mass disposed within and spaced apart from the frame;
   six pairs of shear crystals mechanically coupled to the frame; and
   six suspension blades each coupled at a center portion to the test mass normal to opposite ends of each of the three orthogonal principal axes, respectively, and coupled with a respective pair of shear crystals at each lateral end of the suspension blades, thereby suspending the test mass within the frame;
   wherein the sensor is oriented with respect to three orthogonal principal axes that each pass through a center of mass of the test mass; and
   wherein the sensor is responsive to translational motion parallel to the three orthogonal principal axes and to rotational motion about the three orthogonal principal axes.

17. The sensor of claim 16, wherein a mass distribution of the test mass is symmetric.

18. The sensor of claim 16, wherein the six suspension blades are arranged in three pairs with the suspension blades in each pair arranged parallel to each other on opposing sides of the test mass.

19. The sensor of claim 16, wherein the suspension blades are conductive and an electrical connection is formed between each pair of shear crystals and the corresponding suspension blade.

20. The sensor of claim 16, wherein a rigid insulator is positioned between each of center portions of the suspension blades and the test mass.

21. The sensor of claim 16, wherein the suspension blades are made of beryllium copper.

22. The sensor of claim 16, wherein the suspension blades are formed as flat plates with two apertures formed between a center section and respective lateral end sections.

23. The sensor of claim 16, wherein each suspension blade is stiffer along a longitudinal sensing axis than along axes perpendicular thereto.

24. The sensor of claim 23, wherein the longitudinal sensing axis of each suspension blade is parallel to one of the orthogonal principal axes and is perpendicular to a second one of the orthogonal principal axes.

25. The sensor of claim 16, wherein:
a plurality of planar coupling surfaces is formed on an outer surface of the test mass and each of the planar coupling surfaces is positioned normal to one of the three principal axes; and
a center portion of each of the suspension blades is attached to a respective planar coupling surface of the test mass.

26. The sensor of claim 25, wherein a rigid insulator is positioned between each of the suspension blades and the respective planar coupling surface of the test mass.

27. The sensor of claim 25, wherein a distance, measured between a respective planar coupling surface at which a corresponding one of the suspension blades couples with the test mass and the center of mass of the test mass, is less than a radius of the test mass.

28. The sensor of claim 25, wherein:
each planar coupling surface is parallel to a plane defined by two of the orthogonal principal axes and is a first distance away from the plane;
the frame is defined by twelve beams and each beam of the frame defines a pocket midway along a length of the beam;
a base of each pocket defines an attachment surface to which a respective shear crystal is coupled;
each attachment surface is parallel to the plane, is a second distance from the plane, and is connected to the test mass at a corresponding planar coupling surface by a respective suspension blade through the respective shear crystal; and
the first distance is greater than the second distance.

29. The sensor of claim 16, wherein a distance, measured between a respective coupling point at which a corresponding one of the suspension blades couples with the test mass and the center of mass of the test mass, is less than a radius of the test mass.

30. The sensor of claim 16, wherein:
the frame is defined by twelve beams and each beam of the frame defines a pocket midway along a length of the beam; and
a base of each pocket defines an attachment surface to which a respective shear crystal is coupled.

31. The sensor of claim 30, wherein a rigid insulator is positioned between each of the shear crystals and each respective attachment surface in the pocket of the frame.

32. The sensor of claim 16, wherein walls of the hollow, spherical test mass are of uniform thickness.

33. The sensor of claim 16, wherein the shear crystals are oriented with respect to respective suspension blades to respond primarily to acceleration parallel to a longitudinal sensing axis of each respective suspension blade.

34. The sensor of claim 16, wherein the shear crystals are responsive to shear stress and are oriented with respect to respective suspension blades to respond primarily to shear stress in a plane defined by a longitudinal sensing axis of each respective sensing blade parallel to a first one of the principal axes and by a second one of the principal axes extending outward from the center of mass of the test mass normal to the longitudinal sensing axis of each respective suspension blade.

35. A multi-axis, single mass acceleration sensor comprising:
a three-dimensional frame;
a plurality of struts;
a plurality of transducers; each transducer mechanically coupled between the frame and a respective location on a strut of the plurality of struts; and
a test mass disposed within and spaced apart from the frame, wherein the test mass is coupled to respective locations on the plurality of struts, different from the respective locations on the struts at which the plurality of transducers are coupled, thereby suspending the test mass within the frame,
wherein the sensor is responsive to translational motion in multiple independent directions and to rotational motion about multiple independent axes.

* * * * *